US012448902B2

(12) United States Patent
Millier et al.

(10) Patent No.: US 12,448,902 B2
(45) Date of Patent: Oct. 21, 2025

(54) FLUID TRANSFER DEVICE WITH HYDRAULIC AND MECHANICAL CONNECTION MEANS

(71) Applicant: SAFRAN AIRCRAFT ENGINES, Paris (FR)

(72) Inventors: Vincent Francois Georges Millier, Moissy-Cramayel (FR); Jean Charles Olivier Roda, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/719,178

(22) PCT Filed: Dec. 13, 2022

(86) PCT No.: PCT/FR2022/052322
§ 371 (c)(1),
(2) Date: Jun. 12, 2024

(87) PCT Pub. No.: WO2023/118688
PCT Pub. Date: Jun. 29, 2023

(65) Prior Publication Data
US 2025/0129724 A1 Apr. 24, 2025

(30) Foreign Application Priority Data

Dec. 20, 2021 (FR) ...................... 2113966

(51) Int. Cl.
*F16H 57/04* (2010.01)
*F01D 25/18* (2006.01)
*F04D 29/36* (2006.01)

(52) U.S. Cl.
CPC ........... *F01D 25/18* (2013.01); *F04D 29/362* (2013.01); *F05D 2220/323* (2013.01);
(Continued)

(58) Field of Classification Search
CPC .. F01D 25/18; F05D 2260/98; F05D 57/0426; F16H 57/0426
See application file for complete search history.

(56) References Cited

U.S. PATENT DOCUMENTS 5,779,446 A * 7/1998 Althof ...................... F01D 7/00
416/49
5,836,743 A * 11/1998 Carvalho .............. B64C 11/385
416/157 R
(Continued)

FOREIGN PATENT DOCUMENTS

EP 3138771 A1 3/2017
EP 3144219 A1 3/2017
(Continued)

OTHER PUBLICATIONS

International Search Report received for PCT Patent Application No. PCT/FR2022/052322, mailed on Mar. 21, 2023, 5 pages (2 pages of English Translation and 3 pages of Original Document).

*Primary Examiner* — Paul J Gray
(74) *Attorney, Agent, or Firm* — WOMBLE BOND DICKINSON (US) LLP

(57) ABSTRACT

A fluid transfer device for a turbomachine with longitudinal axis X, which includes a stator portion intended to be connected to a stator equipment of the turbomachine and a rotor portion engaged in the stator portion. The stator equipment including at least one conduit fluidly connected to at least one pipeline of the stator portion, the stator portion and the stator equipment including an attachment interface intended to releasably receive attachment members, the attachment interface and the attachment members being configured so as to make a sealed coincidence of the pipelines and conduit, and the transfer device comprising at least one passage allowing the access of an external tool upstream of the transfer device for accessing the attachment (Continued)

members and passing through the transfer device in either side.

14 Claims, 12 Drawing Sheets

(52) U.S. Cl.
CPC .... *F05D 2230/60* (2013.01); *F05D 2260/406* (2013.01); *F05D 2260/70* (2013.01); *F05D 2260/98* (2013.01)

(56) References Cited

U.S. PATENT DOCUMENTS

| | | | |
|---|---|---|---|
| 8,277,182 B2 * | 10/2012 | Perkinson | ................. F01D 7/00 416/157 R |
| 2023/0417192 A1 * | 12/2023 | Levisse | ................... F01D 5/026 |

FOREIGN PATENT DOCUMENTS

| | | |
|---|---|---|
| FR | 2993631 A1 | 1/2014 |
| WO | 2015/052459 A1 | 4/2015 |

\* cited by examiner

[Fig.1]
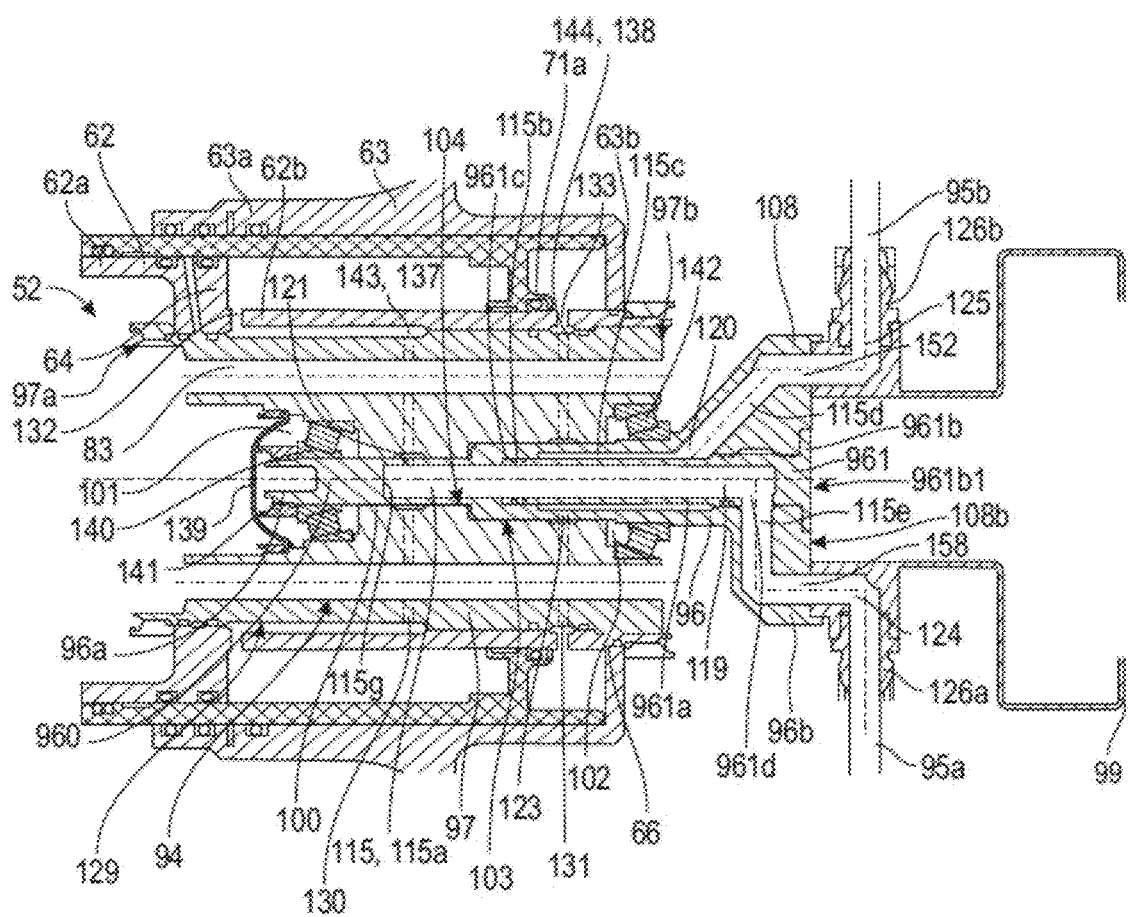

[Fig.2]
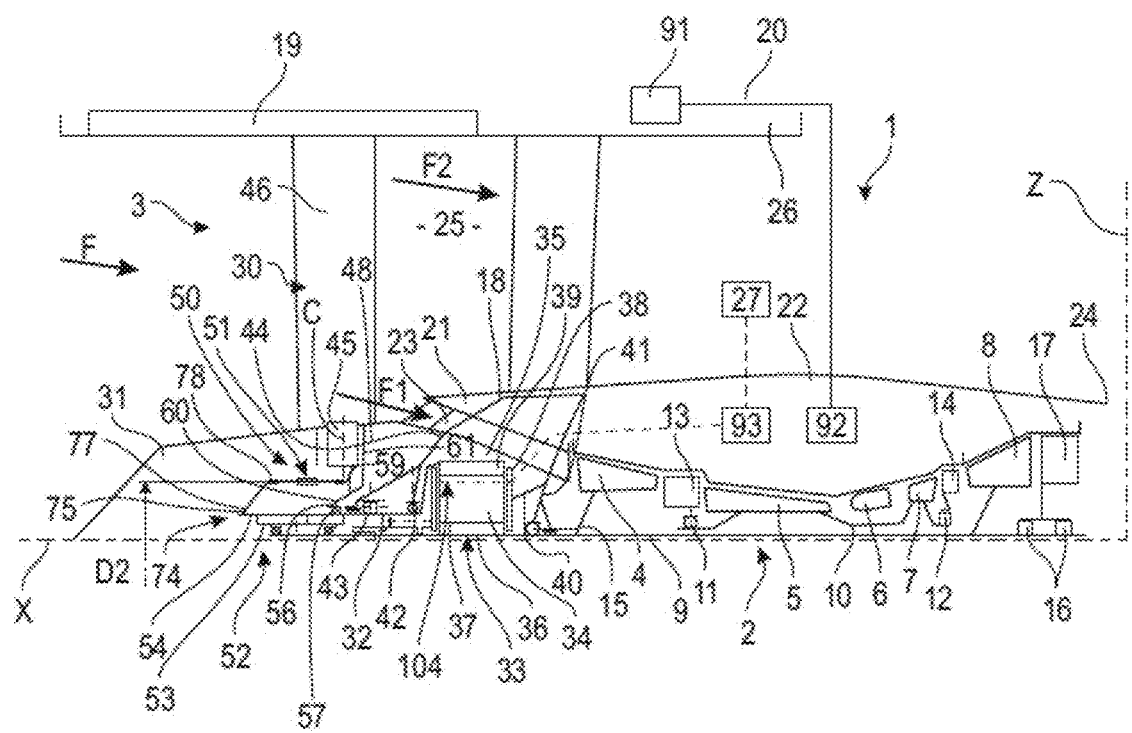

[Fig.3]
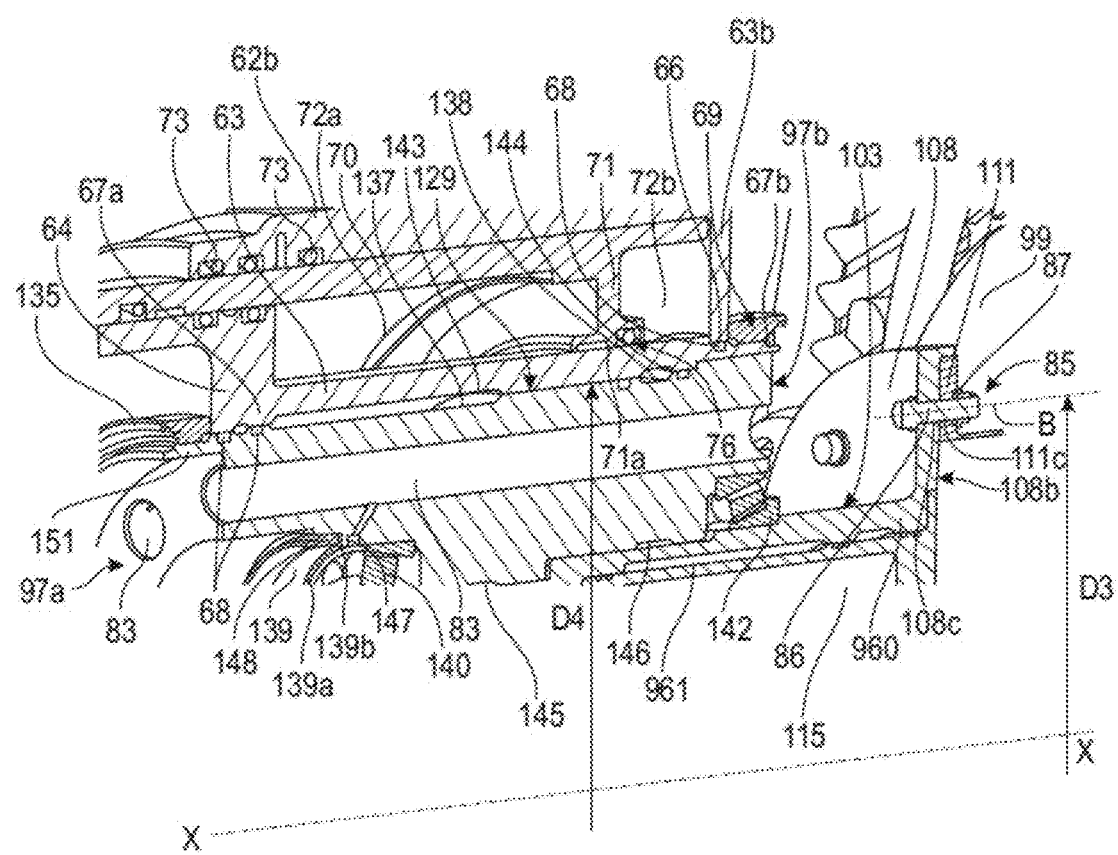

[Fig.4]
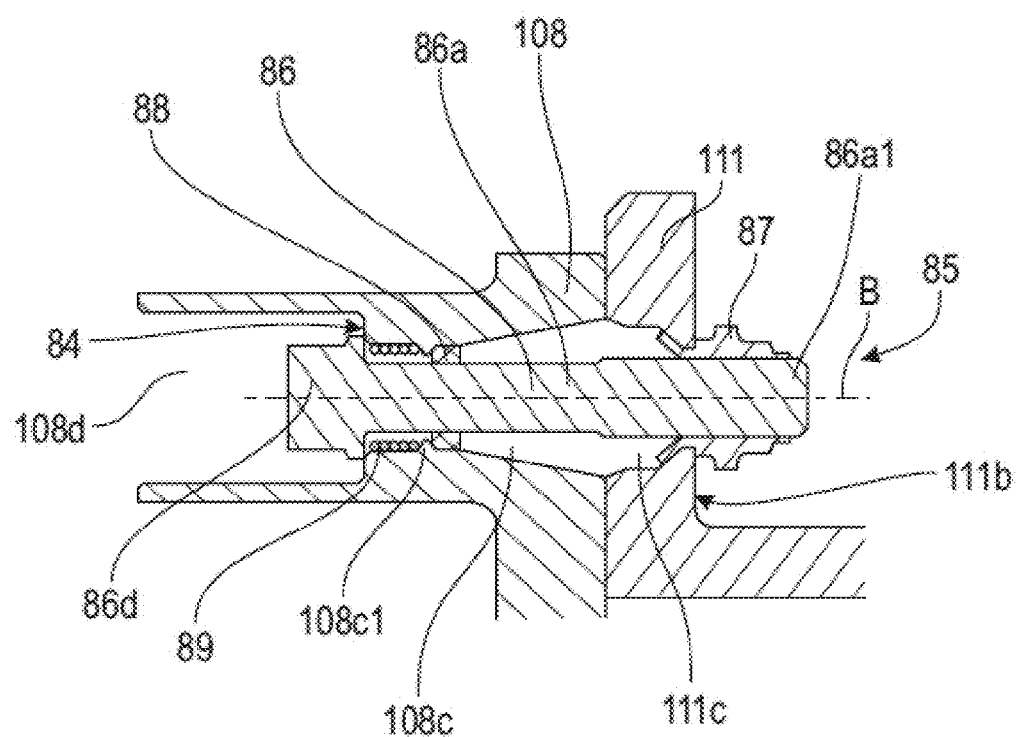

[Fig.5]
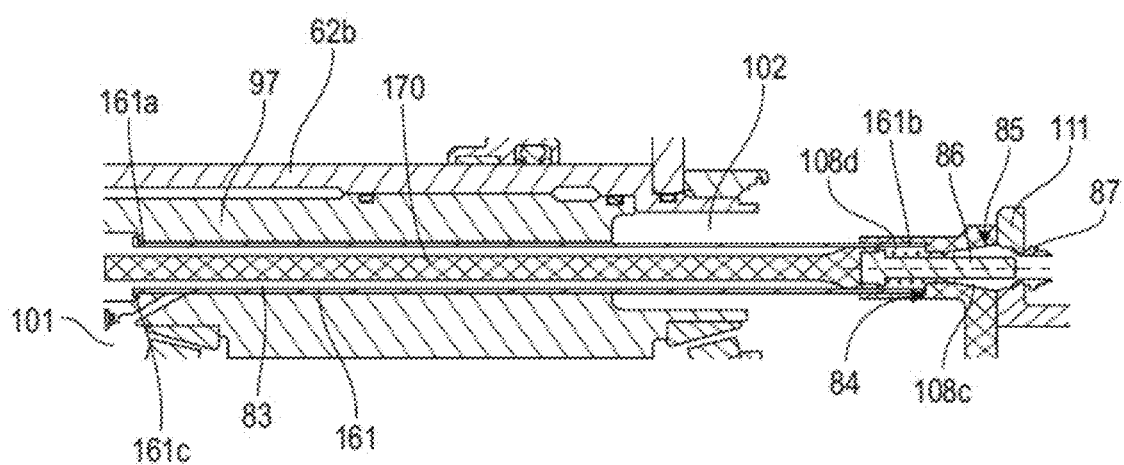

[Fig.6]
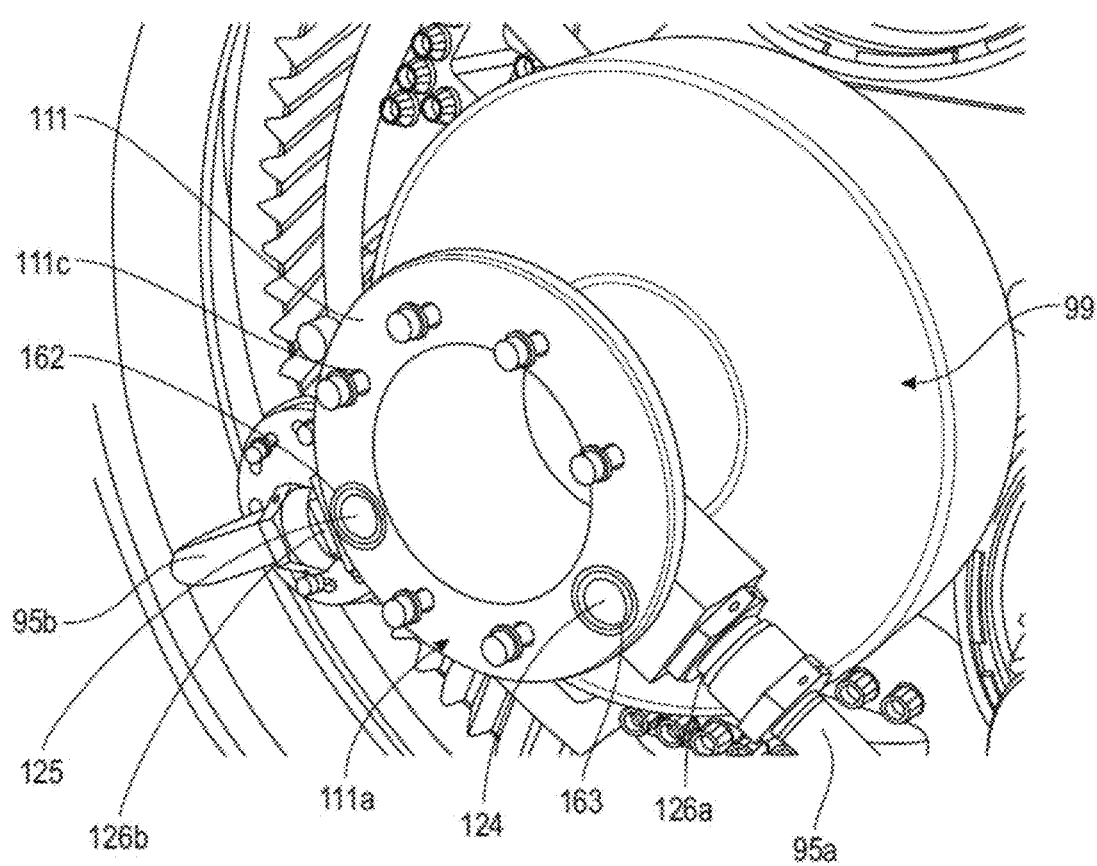

[Fig.7a]
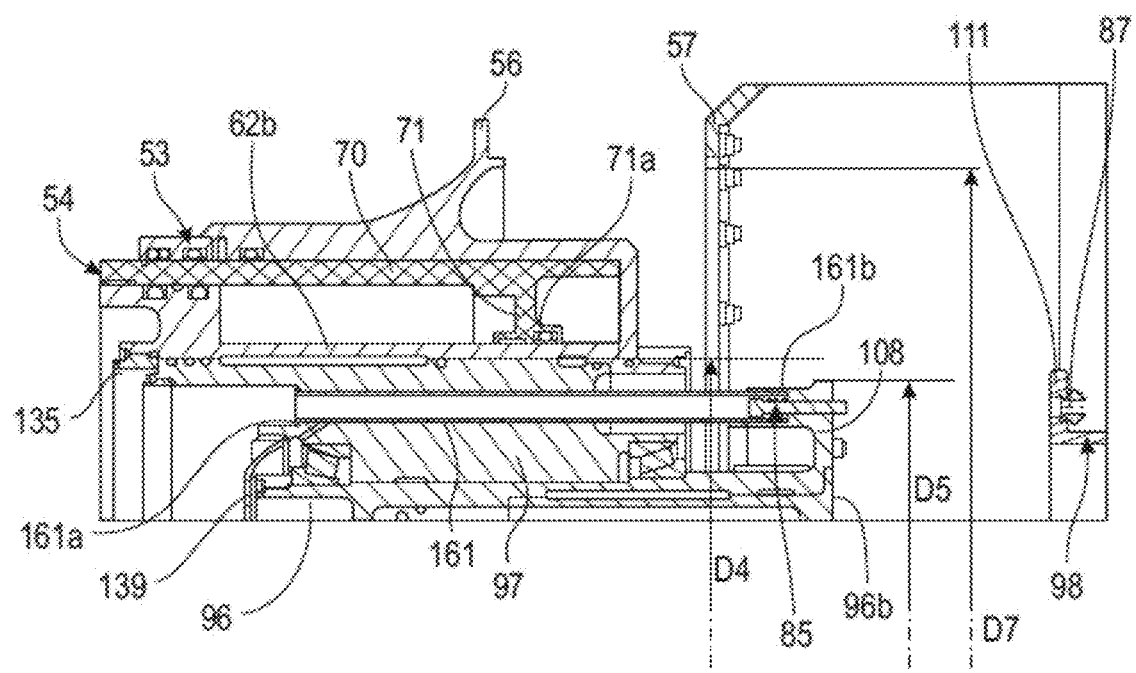

[Fig.7b]
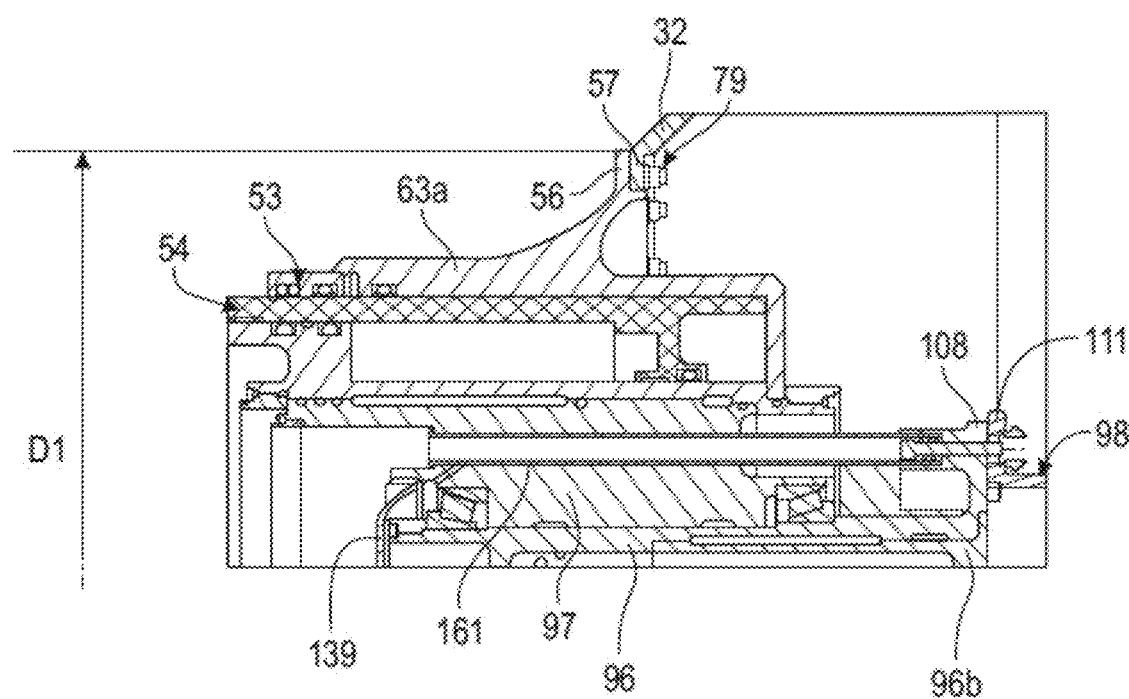

[Fig.7c]
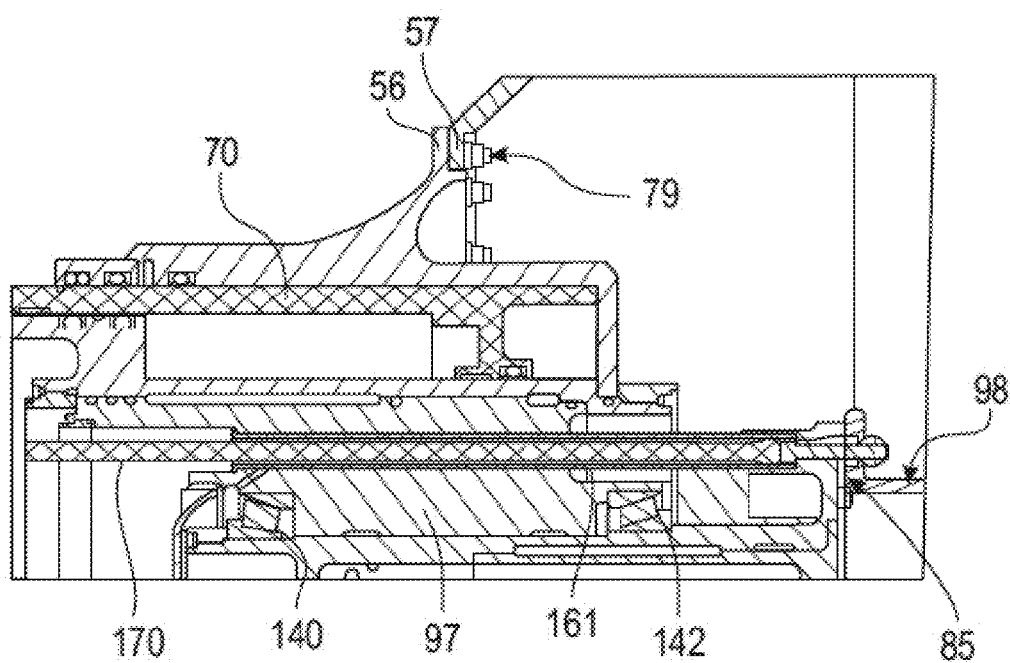

[Fig.7d]
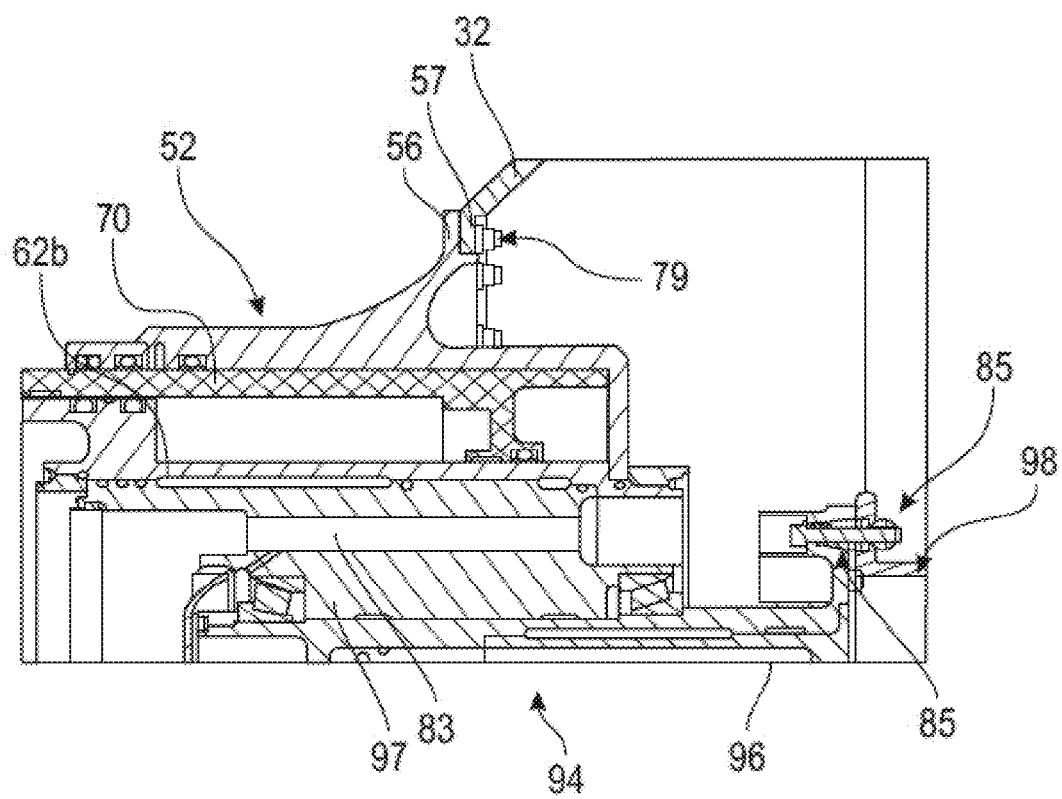

[Fig.8]
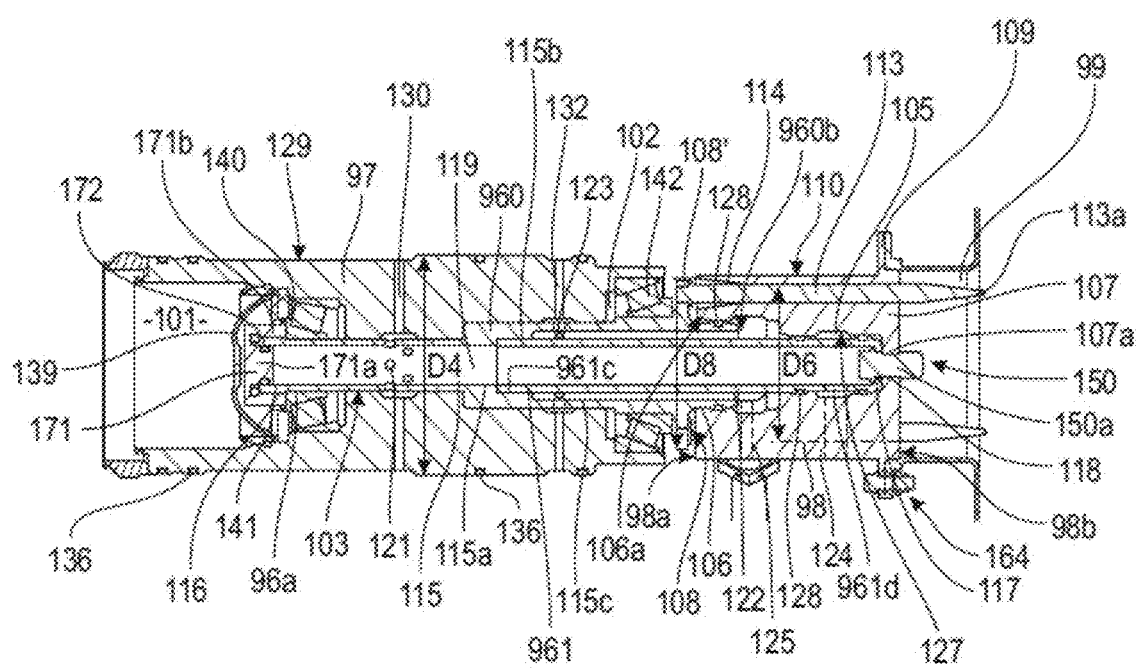

[Fig.9]
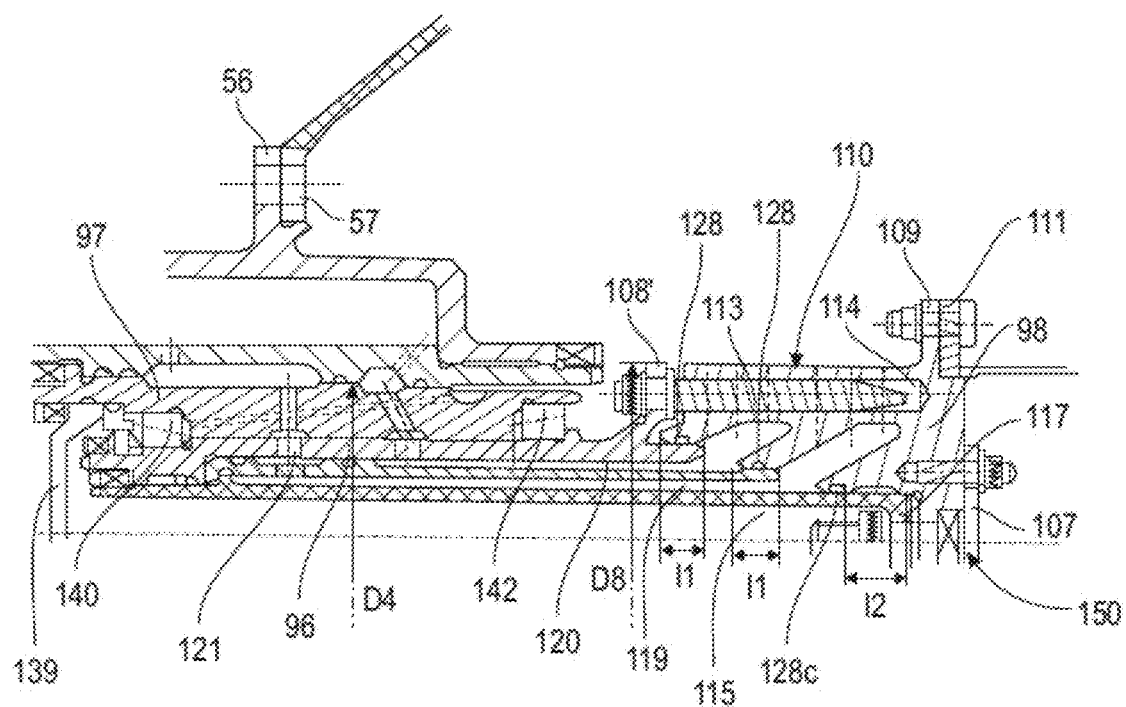

FLUID TRANSFER DEVICE WITH HYDRAULIC AND MECHANICAL CONNECTION MEANS

TECHNICAL FIELD OF THE INVENTION

The present invention relates to the field of the fluid transfer devices between a stator and a rotor.

TECHNICAL BACKGROUND

The prior art comprises the documents WO-A1-2015/052459, EP-A1-3138771, and FR-A1-2993631.

Some machines comprise a fluid transfer device, such as oil or fuel, allowing the passage of the fluid from a stationary reference frame (stator) to a rotating reference frame (rotor), or vice versa, where there are members that require a continuous feed and lubrication in order to preserve their service life, their operation as well as the performance of the machine they equip. Such a device is known by the acronym "OTB" for "Oil Transfer Bearing".

An example of fluid transfer device is described in the document EP-A1-3144219, which describes a fluid transfer device that is movably mounted within the actuator that equips a turbomachine vane pitch change system. The transfer device comprises at least one pipeline in fluidic communication with feeding means for feeding the control means according to the operating mode of the turbomachine. The actuator comprises a movable body that displaces relative to an annular body. Bearings are mounted radially between the movable body and the transfer device to allow the rotation of the movable body relative to the fluid transfer device. The latter displaces in translation along the longitudinal axis. A stop clamp stationary in displacement and with respect to which the piston rotates by means of bearings is also mounted inside the transfer device.

The arrangement of the transfer device in relation to the actuator and the stop clamp is complex because it requires the displacement of several parts in relation to each other. In particular, the pipeline of the transfer device must be aligned with the feeding means of the actuator and of the stop clamp. There is no way to make this hydraulic connection, nor to verify the reliability of this hydraulic connection. The mounting of these parts, due to the necessary alignment according to the mode of operation, can be long and costly. In addition, the configuration of the fluid transfer device requires the dismounting of the assembly of the actuator prior to dismount the transfer device. This can impact the repair time for maintenance.

SUMMARY OF THE INVENTION

The objective of the present invention is to provide a fluid transfer device with a simple configuration that allows for quick mounting and dismounting.

This objective is achieved in accordance with the invention by means of a fluid transfer device for a turbomachine with longitudinal axis X, the transfer device comprising a stator portion which is intended to be connected to a stator equipment of the turbomachine and a rotor portion in which the stator portion is engaged, the stator equipment comprising at least one conduit fed by a feed source and in fluidic communication with at least one pipeline of the stator portion, the stator portion and the stator equipment comprising an attachment interface intended to releasably receive attachment members, the attachment interface and the attachment members being configured in such a way as to make a coincidence, with sealing, of the pipeline and of the conduit, and in that the fluid transfer device comprises at least one passage allowing the access of an external tool upstream of the fluid transfer device in order to access the attachment members, and passing through the transfer device on both sides.

Thus, this solution allows to achieve the above-mentioned objective. In particular, such a compactly arranged transfer device, whose stator portion is intended to be attached to a stator, allows the hydraulic and mechanical connections to be made almost automatically and blindly on one side (downstream), and access to the attachment members for the mechanical connection of the parts from the other side (upstream) of the transfer device. The fluid transfer device has a low number of connections to be dismounted, in this case an attachment interface that facilitates the mounting and the dismounting. This implies a reduced installation and removal time and an economic gain, in particular when the transfer device is to equip an aircraft.

The transfer device also comprises one or more of the following characteristics, taken alone or in combination:
- the rotor portion extends between an upstream face and a downstream face along the longitudinal axis, the rotor portion comprising a central bore centred on the longitudinal axis and in which the stator portion is engaged, the central bore opening into a first cavity opening onto the upstream face and into a second cavity opening onto the downstream face, bearings for guiding the rotor portion in rotation with respect to the stator portion being placed in the first cavity and in the second cavity, the stator portion extending, along the longitudinal axis, between a first end which is arranged in the first cavity and a second end which extends outside the rotor portion.
- the stator portion comprises a first pipeline and a second pipeline which are distinct, with at least one segment of the second pipeline extending outside the first pipeline.
- the rotor portion comprises channels which are in fluidic communication, on the one hand, with the pipes and, on the other hand, with feeding means for feeding a member of the turbomachine.
- the rotor portion comprises the passage which is arranged radially outside of the central bore and in that the attachment interface comprises a collar carried by the stator equipment and a radial flange carried by the stator portion, the flange and the collar extending radially outward and being attached together by attachment members ensuring an axial connection that is aligned with the passage.
- the radial flange of the stator portion comprises at least one hole of axis B and the rotor portion has a radially external diameter which is greater than the diameter defined by the axis of the hole of the radial flange of the stator portion.
- the collar of the stator equipment comprises at least one corresponding hole, and in that the attachment members are captive and comprise at least one nut crimped on the radial collar of the stator equipment facing the corresponding hole, at least one screw being retained in the hole of the stator portion by a retaining ring, and segregating means for segregating the screw from the corresponding hole.
- the stator portion is provided with an internal bore which is centred on the longitudinal axis and which at least partly forms the first pipeline, the second annular pipeline being arranged radially outside the first pipeline and coaxially with the longitudinal axis.

the stator portion is provided with an internal bore which is centred on the longitudinal axis and which at least partly forms the passage, the first annular pipeline being arranged radially outside the internal bore and coaxially with the longitudinal axis and in that the second annular pipeline is arranged radially outside the first pipeline and coaxially with the longitudinal axis.

the stator equipment comprises an anchoring cavity into which the second end of the stator portion is sleeved in a sealed and blind manner, the anchoring cavity opening into an opening provided in an upstream face of the stator equipment and comprising a bottom arranged opposite the opening.

the attachment interface comprises a first wall that is arranged at the second end of the stator portion and a second wall forming a bottom of the anchoring cavity, the first wall being attached to the second wall of the anchoring cavity via the attachment members ensuring an axial connection that is aligned with the axis of the internal bore.

the rotor portion has a radially external diameter which is greater than or equal to the external diameter of the stator member defined by the external surface, the stator portion extending between the rotor portion and the stator equipment along the longitudinal axis.

the rotor portion has a radially external diameter which is greater than or equal to the external diameter of the flange of the stator portion, the stator portion extending between the rotor portion and the stator equipment along the longitudinal axis.

the transfer device comprises means in fluidic communication on the one hand with the feed source and on the other hand with the control means.

sealing means are arranged between the flange and the collar.

sealing means are arranged between the pipes and the conduits.

the rotor portion of the transfer device is movable in rotation around the stator portion according to the longitudinal axis.

the attachment members are arranged downstream the transfer device.

The invention further relates to an aircraft turbomachine comprising at least one fluid transfer device having any of the foregoing characteristics.

The invention further relates to an aircraft comprising at least one turbomachine as above-mentioned.

The invention also relates to a method for mounting a transfer device as above-mentioned in a turbomachine member, the method comprising:

a step of assembling the transfer device of a fluid in which the stator portion is inserted into the rotor portion, a step of attaching the fluid transfer device to the control means, a step of placing the control means equipped with the fluid transfer device in the turbomachine member, and a step of attaching the attachment interface for attaching the stator portion and the stator equipment by means of the attachment members so as to make a coincidence, with sealing, of the pipeline of the fluid transfer device and of the conduit of the stator equipment.

The method comprises one or more of the following steps and/or characteristics, taken alone or in combination:

the attachment step comprises a sub-step of inserting the external tool into at least the passage of the fluid transfer device to access the attachment members.

the step of attaching the fluid transfer device to the control means comprises a sub-step of mounting the fluid transfer device within the control means.

a step of inserting the sheath in at least one passage.

BRIEF DESCRIPTION OF THE FIGURES

The invention will be better understood, and other purposes, details, characteristics and advantages thereof will become clearer upon reading the following detailed explanatory description of embodiments of the invention given as purely illustrative and non-limiting examples, with reference to the appended schematic drawings in which:

FIG. 1 shows an example of a fluid transfer device provided in a member and comprising a rotor portion integral with the member and a stator portion integral with a stator according to the invention;

FIG. 2 is a schematic view, in axial and partial cross-section, of an example of a turbomachine with a fan or propeller to which the invention applies;

FIG. 3 is a perspective view and partial cross-section of the fluid transfer device and an attachment interface between a stator portion and a stator according to the invention;

FIG. 4 is an axial cross-sectional view of an attachment interface with captive attachment members according to the invention;

FIG. 5 is a detail and axial cross-sectional view of a rotor portion of the fluid transfer device and means allowing for accessing an attachment interface according to the invention;

FIG. 6 illustrates in perspective an example of an element for providing an attachment interface between a fluid transfer device and a member according to the invention;

FIG. 7a, FIG. 7b, FIG. 7c and FIG. 7d are axial cross-sectional views showing different steps of mounting a fluid transfer device on a stator according to the invention;

FIG. 8 shows an example of a fluid transfer device according to the invention;

FIG. 9 shows also another embodiment along an axial and partial cross-section of a fluid transfer device according to the invention.

DETAILED DESCRIPTION OF THE INVENTION

FIG. 1 depicts a fluid transfer device 94 intended for conveying said fluid to feed a turbomachine member between a stator and a rotor. The transfer device or "OTB" for "Oil Transfer Bearing" comprises a stator portion and a rotor portion, one being engaged by the other as explained below.

Such a transfer device 94 is intended to be mounted in a turbomachine 1, in particular an aircraft turbomachine. The turbomachine 1 can be a turbojet engine, for example a turbomachine equipped with a ducted fan (turbofan) or a turboprop engine, for example a turbomachine equipped with an unducted propeller ("open rotor", "USF" for "Unducted Single Fan" or "UDF" for "Unducted Fan").

Of course, the transfer device 94 can be installed in other types of turbomachines and more widely in all types of machines that require a fluid to be transited between a rotating reference frame and a stationary reference frame.

In general and in the following description, the term "fan" is used to designate either a fan or a propeller.

In the present invention, and in general, the terms "upstream", "downstream", "axial" and "axially" are defined in relation to the circulation of the gases in the turbomachine and here along the longitudinal axis X (and even from left to right in FIG. 2). Similarly, the terms "radial", "radially", "internal", "inner", "external", and "outer" are defined with respect to a radial axis Z perpendicular to the longitudinal axis X and with respect to the distance from the longitudinal axis X.

In FIG. 2, the turbomachine 1 comprises a gas generator 2 with a fan 3 mounted upstream. The gas generator 2 typically comprises, from upstream to downstream, a low-pressure compressor 4, a high-pressure compressor 5, a combustion chamber 6, a high-pressure turbine 7 and a low-pressure turbine 8. The turbomachine 1 may comprise a low-pressure body driven by a low-pressure shaft 9 and a high-pressure body driven by a high-pressure shaft 10. The low-pressure and high-pressure bodies are guided in rotation around the longitudinal axis by upstream and downstream rolling bearings. These bearings are carried at least partly by the low-pressure 9 and high-pressure 10 shafts. The high-pressure shaft 10 extends radially at least partly outside the low-pressure shaft 9 and are coaxial.

In another configuration not shown, the low-pressure or weak-pressure body comprises the low-pressure compressor which is connected to an intermediate-pressure turbine. A free power turbine is mounted downstream of the intermediate-pressure turbine and is connected to the fan described below via a power transmission shaft to drive it in rotation.

The fan 3 comprises a series of vanes 30 which is surrounded (or ducted) by a fan casing 19 or unducted. The fan 3 compresses an air flow that enters the turbomachine by dividing into a primary air flow F1 and a secondary air flow F2 at the level of a splitter nose 21. The latter is carried by an inlet casing 18 centred on the longitudinal axis X. The inlet casing 18 is extended downstream by an external casing or inter-duct casing 22. The primary air flow F1 circulates in a primary duct 23 which passes through the gas generator 2 and escapes through a primary nozzle (not shown). The secondary air flow F2 circulates around the external or inter-duct casing 22 (for example in a secondary vein 25 and escapes through a secondary nozzle (not shown)). The primary duct 23 and the secondary duct 25 are separated by the inter-duct casing 22.

The fan 3 comprises a fan rotor 31 through which a cylindrical fan shaft 32 passes, centred on the longitudinal axis X, and which drives in rotation the fan rotor 31 about the longitudinal axis X. The fan shaft 32 is driven in rotation by the low-pressure shaft via a speed reducer 34 allowing to reduce the rotational speed of the fan shaft 32 relative to the speed of the low-pressure shaft 9. On the other hand, the speed reducer 34 allows the arrangement of a fan with a large diameter so as to increase the bypass ratio.

The reducer 34 is of the planetary gear train type. The latter is housed in a lubrication enclosure 35 in which it is lubricated. Typically, the speed reducer 34 comprises a sun gear 36 (or inner planetary), planet gears 37, a planet carrier 38, and an outer ring gear 39 (or outer planetary). In the present example, the sun gear 36 is centred on the longitudinal axis X and is rotatably coupled with the low-pressure shaft 9. The planet gears 37 (in the form of pinions) are carried by the planet carrier 38 and each rotate about an axis substantially parallel to the longitudinal axis X. Each of the planet gears 37 meshes with the sun gear 36 and the outer ring gear 39. The planet gears 37 (at least three) are arranged radially between the sun gear 36 and the outer ring gear 39. The outer ring gear 39 is rotatably coupled to the fan shaft 32 and is centred on the longitudinal axis. In this way, the sun gear 36 forms the inlet of the speed reducer 34 while the outer ring gear 39 forms the outlet thereof. On the other hand, the planet carrier 38 is stationary in relation to the ring gear 39. In particular, the planet carrier 38 is attached to a stationary structure of the turbomachine via a support shroud 40 rigidly attached to the inlet casing 18 of the turbomachine. The support shroud 40 is also attached to a first bearing support 41, stationary, that is integral with the inlet casing 18. Alternatively, the planet carrier 38 is attached to a radially internal shroud of the inlet casing 18 or directly to a second bearing support 44 that is installed upstream of the speed reducer 34.

The fan vanes 30 are of variable pitch. Each fan vane 30 comprises a root 45 and a blade 46 extending radially outward from the root 45. The root 45 of each vane 30 is typically in the form of a shaft that is pivotally mounted along a pitch axis C in an internal housing 47 of an annulus 48. The annulus 48 is integral with the fan rotor 31, is centred on the longitudinal axis and comprises several housings 47 evenly distributed around the axis X. There are as many housings 47 as there are vane roots 45. The pitch axis C is parallel to the radial axis Z. The shaft of each root 45 is pivotally mounted by means of guide bearings (at least two for example) (not shown) mounted in each housing 47 and in a superposed manner along the radial axis Z.

The pitch of the fan vanes 30 is made by a pitch change system 50 installed in the fan rotor 31 and upstream of the speed reducer 34. The pitch change system 50 comprises a control means 52 intended for acting on the vanes 30 of the fan. The pitch change system 50 also comprises a connection mechanism 51 connected to the vanes 30 of the fan and to the control means 52.

With reference to FIG. 2, the control means 52 is arranged upstream of the speed reducer 34. The control means 52 comprises an annular body 53 and a movable body 54 that displaces relative to the annular body 53. Advantageously, but not restrictively, the control means 52 is a linear actuator (linear cylinder) with an axis coaxial to the longitudinal axis X. Alternatively, the actuator is of the rotary type (rotary cylinder) along the longitudinal axis X. In the present example, the annular body 53 is integral in rotation with the fan shaft 32. The movable body 54 displaces mainly in translation along the longitudinal axis X with respect to the annular body 53. The movable body 54 also displaces with a slight rotational movement by oscillation relative to the annular body. The annular body 53 is therefore rotating but not translating. Alternatively, the movable body 54 displaces only in translation.

In FIG. 2, the annular body 53 comprises a first flange 56 that extends radially outward and is attached to a second flange 57 of the fan shaft 32. The flanges are attached together via attachment members 79 (see FIGS. 7b, 7c, 7d) such as screws, nuts, bolts, or any other suitable element allowing a quick mounting and dismounting. Alternatively, not shown, the second flange 57 is carried by a trunnion which is attached to the external wall of the fan shaft 32 by suitable attachment elements. The annulus 48 retaining the vanes is also connected to the fan shaft 32 by means of a rotatable fan cone 59. To this end, the fan cone 59 comprises a third radial flange 60 that is attached to the flanges 56, 57 of the annular body and the fan shaft. The three flanges 56, 57 and 60 are attached together by the attachment members. Furthermore, at least the flanges 56, 57 have an external diameter (defined by their external border) (and here represented by the diameter D1 of the flange 56 in FIG. 7b) that is smaller than the diameter D2 (shown in FIG. 2) that is defined by the connection mechanism 51. The surfaces of the external borders of the flanges 56, 57 are flush. In other words, these flanges 56, 57 have a smaller radius than the mechanism 51. In this way, the control means 52 and fluid transfer device 94 assembly can be inserted or extracted by passing through the still attached connection mechanism 51 without impediment.

The fan cone 59 also comprises a radial tab 61 that is attached to a downstream flank of the annulus 48. The attachment of the fan cone 59 downstream of the annulus 48 allows the integration of the connection mechanism 51 (upstream) and reduces the axial bulk. The annulus 48 also comprises an upstream flank (axially opposite the downstream flank) that is attached to the fan rotor 31. By connecting the annular body 53 to the fan rotor (annulus 48 in particular), the forces transiting from the fan rotor by means of the control means 52 and the fluid transfer device 94 described later in the description are avoided. Here, the force path passes directly from the fan cone 59 to the fan shaft 32 and to the guide bearings 42, 43 of the fan shaft 32 (see FIG. 1). The guide bearings 42, 43 are carried by the bearing support 44. The bearings 42 and 43 are arranged upstream of the speed reducer.

In FIG. 1, the annular body 53 is generally cylindrical, centred on the axis X, and generally circular in cross-section. Such a configuration allows to limit the bulk of the control means 52 in the fan rotor 31 both axially and radially. The annular body 53 forms the cylinder shape or case of the cylinder and the movable body 54 forms the piston. In particular, the annular body 53 is formed of two parts hereinafter referred to as first cylindrical casing 62 and second cylindrical casing 63. The first and second casings are hollow and centred on the longitudinal axis X. The first casing 62 has two different sections so as to form a main body 62a and a tubular segment 62b. The hollow tubular segment 62b has a smaller diameter than that of the main body 62a. The tubular segment 62b extends downstream from the main body 62a. The tubular segment 62b is separated from the main body 62a by a shoulder 64.

With reference to FIGS. 1 and 3, the second cylindrical casing 63 is sealingly mounted around the first casing 62 so as to form a sealed volume. The second casing 63 comprises a radial wall 63b from which extends a cylindrical wall 63a with an axis centred on the longitudinal axis X. The cylindrical wall 63a extends radially around (outwardly) from the tubular segment 62a and away to form the volume. The cylindrical wall 63a carries the flange 56. The radial wall 63b is defined in a plane perpendicular to the longitudinal axis X. The radial wall 63b comprises a central hole 66 delimited by an annular surface. The hole 66 passes through the radial wall 63b on both sides along the longitudinal axis X.

The tubular segment 62b extends between an upstream end 67a and a downstream end 67b. The downstream end 67b passes through the central hole 66 to be downstream of the radial wall 63b. A segment of an internal surface (oriented inward the control means) of the radial wall 63b, extending in a radial plane and surrounding the central hole 66 is supported against a radial bearing surface of the tubular segment 62b. The bearing surface is arranged at the level of the downstream end 67b of the tubular segment 62b. An annular seal 68 is arranged radially between the annular surface bordering the central hole 66 and the radially external surface of the upstream end 67b. A tightening member 69 such as a nut, centred on the longitudinal axis, is mounted around the radially external surface of the downstream end 67b and supported axially against the radial wall 63b (against an external surface opposite the internal surface).

The movable body 54 comprises an annular cylindrical wall 70 that extends along the longitudinal axis X and is radially arranged in a sealed manner between the first casing 62 and the second casing 63 by seals and guide segments 76. The movable body 54 further comprises an annular wall 71 that extends radially inward from the cylindrical wall 70. The annular wall 71 sealingly contacts an external surface of the tubular segment 62b. In other words, the annular wall also comprises a through hole of longitudinal axis X. The tubular segment 62b is installed through the hole in the annular wall 71 so as to define two variable volume chambers 72a, 72b in the annular body 53. The chambers 72a, 72b are arranged between the annular body 53 and the movable body 54. Seals and guide segments 76 are arranged between the free border 71a of the annular wall 71 and the radially external surface of the cylindrical wall 70 of the tubular segment 62b. In particular, inwardly open gorges are provided at the level of this free border 71a to receive a guide segment (or flat annular seal) and an O-ring.

The movable body 54 displaces along the longitudinal axis. Sealing means 73 are also arranged, on the one hand, on either side of the cylindrical wall 70 so as to prevent the leaks of a fluid feeding the chambers 72a, 72b, and on the other hand, radially around the tubular segment 62b.

Also in FIG. 1, the movable body 54 displaces axially under the action of a command from the control means 52, and in particular of the pressure of a fluid circulating in each chamber. To this end, the pitch change system 50 comprises feeding means ensuring the command thereof, described later in the description. The fluid received in chambers 72a, 72b is, for example, a pressurized hydraulic fluid from a fluidic feed system 90, so that the movable body 54 occupies at least two positions. Of course, the movable body 54 occupies several intermediate positions according to the different phases of flight of the aircraft. These two positions correspond respectively to the reverse thrust position and the feathering position of the variable pitch vanes 30. The displacement of the movable body 54 along the longitudinal axis X causes the movement of the connection mechanism 51, so that it generates the pivoting and the pitch of the blades of the vanes about the pitch axis C.

With reference to FIG. 2 and as previously announced, the turbomachine 1 comprises a fluidic feed system 90 allowing for distributing a fluid towards the various members and/or equipment that require it, such as the control means 52. The fluidic feed system 90 comprises a feed source 91 (or a reservoir, schematically illustrated in FIG. 2), a hydraulic pump 92 allowing for circulating the fluid towards the members and/or equipment from the feed source 91, and a servo valve 93 allowing for regulating the pressure of the fluid in the control means 52 according to the required pitch. The servo valve 93 is electrically controlled by an electronic computer 27 of the turbomachine, which is known by the acronym "ECU" for "Electronic Control Unit". The feed source 91 is arranged in a stationary reference frame of the turbomachine and generally in the nacelle surrounding the turbomachine 1 or in the inter-duct casing 22. The pump 92 and the servo valve 93 are also arranged in the stationary reference frame of the turbomachine.

The turbomachine 1 comprises a fluid transfer device 94 such as the one shown in FIG. 1 that allows the transfer of fluid from the stationary reference frame where the feed source is located, to the rotating reference frame of the turbomachine 1 where the control means 52 to be fed with fluid is located. The transfer device 94 is arranged upstream of the speed reducer 34. The location of the fluid transfer device 94 is advantageous because it allows for easy dismounting/mounting without interfering with the speed reducer. The feed system 90 also comprises a plurality of feed pipes 95 for conveying the fluid towards the members and/or equipment. The pipes 95 are connected to the servo valve 93 on the one hand and to the transfer device 94 on the other hand, passing through the planet carrier 38. The planet carrier immovable in rotation allows the passage of the pipes through it and inside the fan shaft 32.

With reference to FIGS. 1 and 3, the transfer device 94 is arranged within the control means 52 with a very small gap radially at the level of an interface between the transfer device 94 and the control means 52. The bulk is advantageously reduced upstream where the control means 52 is located. The transfer device 94 comprises a stator portion 96 and a rotor portion 97. One of the stator and rotor portions is engaged in the other so as to reduce the bulk and form a compact assembly that is easy to mount and dismount. The stator portion 96 is integrally mounted to a stator. In the example of the transfer device 94 mounted in the control means 52, the stator portion 96 is attached to a stationary structure of the turbomachine, and in particular to the planet carrier 38 via a stator equipment. The stator equipment may comprise a stator member 98 and/or a tubular element 99. Alternatively, the stator portion 96 is attached directly to the planet carrier 38. The tubular element 99 is configured so as to provide a "flexible connection" between the stator portion 96 and the planet carrier 38. In this way, the risk of misalignment and constraints between the rotor portion 97 and the stator portion 96 are reduced. Other feed systems for the transfer device 94 may be considered to allow degrees of freedom between the same and the speed reducer and accommodate their relative displacements.

The stator portion 96 and the stator equipment 98, 99 comprise an attachment interface intended for releasably receiving attachment members 85. The attachment interface and the attachment members 85 are configured to make a hydraulic connection and a mechanical connection simultaneously. More specifically, these are configured so as to achieve, a coincidence, with sealing, of a pipeline of the transfer device 94 and a conduit of the stator equipment 98, 99. The transfer device 94 comprises at least one passage 83 allowing access for an external attachment tool to easily access the attachment members 85.

In the embodiment shown in FIGS. 1 and 3, the stator portion 96 is attached directly to the tubular element 99, which has a generally cylindrical shape with an axis of revolution and is here centred on the longitudinal axis X. The tubular element 99 is hollow. The stator portion 96 comprises a fourth radial flange 108 that extends radially outward from the external cylindrical surface 103 of the stator portion 96. The tubular element 99 also comprises a collar 111 that extends radially from a radially external surface thereof. The flange 108 is attached to the collar 111 by means of attachment members 85 such as screws, studs, bolts, etc. To this end, the flange 108 comprises a downstream face 108b bearing against an upstream face 111a (see FIG. 6), of corresponding shape, of the collar 111. The flange 108 comprises at least one hole 108c passing through its wall on either side and each having an axis parallel to the longitudinal axis. The collar 111 shown more specifically in FIG. 4, also comprises at least one corresponding hole 111c passing through its wall on either side. The flange 108 and the collar 111 comprise a plurality of holes 108c and corresponding holes 111c respectively distributed about the longitudinal axis X. When the flange 108 and the collar 111 are pressed together, the holes and corresponding holes 108c, 111c face each other. The attachment members 85 comprise screws 86 that pass through the holes and corresponding holes and form an axial connection. The flange 108 and the collar 111 form the attachment interface. The attachment members 85 also comprise nuts 87 through which the screws 86 pass to tighten the flange and collar.

With reference to FIG. 4, and advantageously, the attachment members 85 are captive. In the present application, the term "captive" is used to describe an element that is still attached to a first part even though that part is not attached to another second part. In particular, here the attachment members 85 are attached or connected or enclosed with the stator portion or stator equipment once the stator equipment or stator portion 96 is dismounted. This allows to make the mounting/dismounting more reliable and to a great extent the maintenance because it avoids screws falling into the enclosures with fluids during a maintenance operation. For this purpose, the attachment members 85 comprise retaining means for retaining the screws and nuts on the flange 108 and the collar 111. Specifically, the nuts 87 are crimped onto the collar 111 of the tubular element 99 and are arranged opposite the corresponding hole. In particular, each nut 87 is crimped at the level of the downstream face 111b (opposite the upstream face 111a along the longitudinal axis X) of the collar 111. The nuts 87 each comprise an internal thread cooperating with an external thread of a rod 86a of the screw 86. Each screw 86 is retained in a hole 108c of axis B of the stator portion 96 (here the flange 108) by a retaining ring 88. The latter has an axis that is coaxial with the axis of the hole 108 (and parallel to the longitudinal axis X). The external diameter of each retaining ring 88 is equal to or substantially greater than the internal diameter of the hole 108c. In this way, the retaining ring 88 can be force-mounted on or adjusted to prevent it from being pulled out of the hole. Alternatively, the retaining ring 88 is glued into the hole. Similarly, the internal diameter of each retaining ring 88 is substantially equal to or approximately 0.5 mm greater than the external diameter of the rod 86a of a screw 86. In this way, the screw 86 can easily pass through and displace inside the retaining ring 88 when it is screwed into the nut 87. In an advantageous, but non-limiting characteristic, the retaining ring 88 is axially locked by an annular projection 108c1 that extends towards the axis of the hole. However, the free end of the annular projection 108c1 defines an internal diameter greater than the diameter of the rod 86a of the screw 86. This allows the insertion and the removal of the rod 86a from the screw 86.

Segregation means are also provided in at least one of the holes and corresponding hole. In this example, the segregation means comprise a spring 89 that is mounted in each hole 108c of the flange 108 of the stator portion 96. Each spring 89 is locked axially downstream by the annular projection 108c1. In other words, each spring 89 is mounted upstream of a retaining ring 88. The spring 89 is locked upstream by the screw head 86b. Each screw head 86b is intended to be in abutment against a bearing surface 84 surrounding the hole 108c. The bearing surface 84 is defined in a plane perpendicular to the longitudinal axis or the axis B of the hole 108c. Each screw 86 is movable between a rest position in which the spring 89 holds the screw head 86b away from the bearing surface 84 by its return force and an active position in which the screw head 86b is in abutment against the bearing surface 86. In the rest position, the free end 86a1 of the rod 86a is also maintained away from the nut 87 (or corresponding holes 111c) by the spring 89 being in a rest position (as shown in FIG. 5). In the active position, the spring 89 is compressed between the screw head 86b and the annular projection 108c1 and the free end 86a1 is screwed into the stacked nut 87.

In FIG. 6, the tubular element 99 comprises a first conduit 124 and a second conduit 125. The first conduit 124 and the second conduit 125 open into the upstream face 111a (defined in a plane perpendicular to the longitudinal axis) of the collar 111. Each of the first and second conduits 124, 125 comprises an inlet in fluidic communication with the feed source 91 via the pipes 95. To this end, the tubular element 99 comprises a first port 126a that extends from the external cylindrical surface of the tubular element 99 and is connected to one end of the first pipe 95a. The tubular element 99 also comprises a second port 126b extending from the external cylindrical surface thereof and connected to the second pipe 95b. The conduits 124, 125 open into the upstream face 111a via orifices that form the outlet thereof.

Furthermore, the tubular element 99 is hollow. Its internal diameter is substantially equal to or greater than the external diameter of the stator member 98. The external diameter of the stator member 98 is delimited by an external surface 110. In this way, the internal bore of the tubular element 99 is large enough to allow the access to a shaft line nut located downstream at the level of the speed reducer 34. The internal diameter of the internal bore of the tubular element 99 is sufficient to pass a tooling used to mount and tighten this nut after dismounting the transfer device 94.

With reference to FIG. 1, the stator portion 96 has a generally cylindrical shape and an axis of revolution that is centred on the longitudinal axis X. More specifically, the stator portion 96 extends between a first end 96a and a second end 96b along the longitudinal axis X. The stator portion 96 also extends between the rotor portion 97 and the stator member. The stator portion 96 is intended to engage in (within) the rotor portion 97. The rotor portion 97 is movable in rotation around the stator portion 96 along the longitudinal axis. The stator portion 96 once mounted within the rotor portion 97 forms an assembly (or a cartridge) that is mounted in the control means 52. To this end, the rotor portion 97 has a cylindrical shape with an axis coaxial with the longitudinal axis X. The rotor portion 97 extends along the longitudinal axis X between an upstream face 97a and a downstream face 97b. The rotor portion 97 is passed through on both sides by a central bore 100 along the longitudinal axis. The central bore 100 opens on the one hand into a first cavity 101 open in the upstream face 96a and on the other hand into a second cavity 102 open in the downstream face 97b. The stator portion 96 is engaged in the central bore 100. The first end 96a of the stator portion 96 is arranged in the first cavity 101 while the second end 96b is arranged outside the central bore 100 and the second cavity 102. In other words, the second end 96b also extends outside the rotor portion 97.

The stator portion 96 comprises an external cylindrical surface 103 complementary in shape to an internal cylindrical surface 104 of the central bore 100. The external diameter of the external cylindrical surface 103 is substantially equal to the internal diameter of the internal cylindrical surface 104 (while allowing the rotation of the rotor portion 97 about the stator portion 96). More precisely, a very small gap separates the rotor portion and the stator portion 96. This gap is known as the "air-gap". The air-gap also forms the first interface between the external cylindrical surface 103 of the stator portion 96 and the radially internal surface 104 of the rotor portion 97. Leaks may occur at this air-gap or interface. These leaks are due to the dimensions of the stator and rotor portions 96, 97 to facilitate the mounting and dismounting and also the operation between the stator portion 96 and the rotor portion 97. Note that the very small gap (about 0.1 mm or less than 0.1 mm) limits the fluid leaks. As illustrated, the stator portion 96 comprises a first section with an external diameter and a second section with an external diameter. According to a non-limiting characteristic, the second section has a diameter greater than the one of the first section. In other words, the central bore 100 is staged and comprises different diameters as well. Of course, the bore can have the same diameter over its entire length as shown in FIG. 9.

The stator portion 96 as shown in FIGS. 1 and 3 is formed of two cylindrical tubes hereinafter referred to as first cylindrical tube 960 and second cylindrical tube 961. The first and second tubes 960, 961 are hollow. The first tube 960 has two sections with different external diameters. The first tube 960 comprises an internal bore 115 whose axis is coaxial with the longitudinal axis (or the axis of the control means 52). The internal bore 115 comprises a bottom 115g and opens into a counterbore formed in the downstream face 108b. In particular, the internal bore 115 is staged or has different radial sections along the longitudinal axis. The first tube 960 comprises a first cylindrical bore 115a with a first diameter, a second cylindrical bore 115b with a second diameter and a third cylindrical bore 115c with a third diameter. The first bore 115a opens into the second bore 115b and the latter opens into the third bore 115c.

The stator portion 96 comprises two connection passages 115d, 115e which each open, on the one hand, into the internal bore 115 and in particular at the level of the third bore 115c and, on the other hand, respectively into a first opening 158 and a second opening 152 at the level of the downstream face 108b. These openings 152, 158 open into the downstream face 108b.

The second tube 961 comprises a base plate 961b from which a cylindrical wall 961a extends. The second tube 961 comprises an open end-piece 961c (opposite the base plate 961b) into which a longitudinal internal cavity opens. The open end-piece 961c is delimited by the free end of the cylindrical wall 961a. The second tube 961 is sealingly installed within the first tube 960 and within the internal bore 115 such that the longitudinal internal cavity is coaxial with the internal bore 115. The base plate 961b is housed in the counterbore of the downstream face 108b and is complementary in shape with it. The base plate 961b also has a face 961b1 having a surface continuity with the downstream face 108b.

The second cylindrical tube 961 further comprises a radial piercing 961d opening on the external surface of the cylindrical wall 961a. The radial piercing 961d is arranged facing an outlet of a connection passage 115e (in installation situation). The cylindrical wall 961a of the cylindrical tube 961 has an external diameter that is substantially equal to the diameter of the second bore 115b but smaller than the diameter of the third bore 115c. In this way, an annular space is formed between the external surface of the second cylindrical tube 961 and the internal surface of the bore 115c.

The rotor portion 97 is rotatably mounted with respect to the stator portion 96 by means of bearings. A first bearing 140 is arranged precisely in the first cavity 101 into which the central bore 100 receiving the first end 96a of the stator portion 96 opens. The first bearing 140 is with rolling. It comprises an internal ring which is carried by the external cylindrical surface 103 of the stator portion 96 and an external ring which is carried by the internal cylindrical surface 104 of the rotor portion 97. The external ring is axially locked by a cylindrical bearing surface. The internal ring is axially locked by an internal nut 141. The latter is mounted on the stator portion 96 and comprises an internal thread cooperating with an external thread of the external cylindrical surface 103 of the stator portion 96. A second bearing 142 is arranged in the second cavity 102 into which the central bore 100 of the stator portion 96 opens. The second bearing 142 is also a rolling bearing. This bearing 142 is mounted downstream of the first bearing 140. The second bearing 142 comprises an internal ring and an external ring. The external ring is carried by the internal cylindrical surface 104 of the rotor portion 97, at the level of the second cavity 102 and is axially locked upstream by a cylindrical bearing surface. The internal ring is carried by the external cylindrical surface 103 of the stator portion 96 and is locked downstream by a cylindrical support of the stator portion 96. In the present example, the rolling-elements of the bearings 140 and 142 are conical rollers with an axial preload. Alternatively, the rolling-elements are angular contact balls, in particular with an axial preload. Such rollings allow to reduce the gap between the radially internal surface of the stator portion 96 and the radially external surface of the rotor portion 97. However, these rollings guarantee a gap (non-contact) (minimum gap) to avoid metal-to-metal contact to prevent the fluid leaks.

In another alternative, not shown, sealing means such as seals or segment rings are placed at the first interface. In this case, the rolling-elements of the bearings are without angular contact.

Similarly, the external diameter of the second bearing 142 is larger than the external diameter of the first bearing 140. However, the external diameter of the second bearing 142 is smaller than the internal diameter of the wall 62b of the control means 52. Thus, the diameter of this bearing is smaller than those of the bearings of the prior art. This further allows to reduce the gap or the clearance, which allows to limit the risks of leak fluid. This arrangement also allows to limit the shearing of the fluid which reduces its heating and on the other hand, to reduce the needs of evacuation of calories. Furthermore, the diameter D4 of the fluid transfer device is smaller than the diameter of the control means, which allows the diameter of the first and second bearings to be destressed. Alternatively, the external diameters of the first and second bearings are substantially identical.

As illustrated in FIGS. 1 and 3, the transfer device 94 comprises an annular sealing cover 139 mounted in the first cavity 101. The sealing cover 139 is configured so as to seal the first cavity 101. This prevents the communication between the interior of the transfer device 94 and an enclosure upstream of it. For this purpose, the sealing cover 139 comprises a hollow body 139a which is more precisely visible in FIG. 3 and which has, along an axial section, a C-shaped or substantially frustoconical shape. The sealing cover 139 comprises an annular tab 139b that is connected to the hollow body 139a and is intended to be in abutment against an annular projection 147 (visible in FIG. 3) provided in the cavity 101. The annular projection 147 is carried by the rotor portion 97 and extends radially towards the axis of the rotor portion 97. Advantageously, a sealing element is installed in an annular gorge of the annular projection 147. The sealing element is located axially between the annular tab 139b and the annular projection 147 to ensure that the cover 139 is sealed. The annular tab 139b is axially locked by an axial locking member 148. The latter is here a nut. The sealing cover 139 is mounted upstream of the first guide bearing 140. The sealing cover 139 is also arranged upstream of the first end 96a of the stator portion 96. In this way, the lubricating fluid of the bearing is contained within the transfer device 94 and the cover 139 delimits a portion of the enclosure 35. In the present application, the lubricating fluid (of the members of the turbomachine such as the bearings/rollings) is identical to the fluid that feed the control means 52.

As previously stated, the transfer device 94 (as shown in FIGS. 1 to 9) is mounted in the control means 52 and more particularly in the hollow, tubular segment 62b in a sealed manner. The rotor portion 97 comprises an external cylindrical surface 129 that is substantially complementary with a radially internal surface 134 of the tubular segment 62b. The external diameter of the rotor portion delimited by the surface 129 (which is also the external diameter D4 of the fluid transfer device) is substantially equal (within the mounting clearance) to the internal diameter of the tubular segment 62b. Similarly, the rotor portion 97 has a length substantially equal to the length of the tubular segment. In the installation situation, the planes passing through the upstream and downstream ends 97a, 97b of the rotor portion 97 are respectively coplanar or within the planes passing through the first and second ends of the tubular segment 62b. In contrast, the first end 96a of the stator portion 96 is inside the tubular segment 62b and the second end 96b is outside the tubular segment 62b. The second end 96b is outside the tubular segment 62b.

In FIG. 3, a tightening member 135 allows the rotor portion 97 to be maintained firmly on the control means 52, in the tubular segment 62b and to achieve an axial locking. Here, the tightening member 135 comprises a nut that is centred on the longitudinal axis X and is mounted within the main body 62a. In particular and in FIGS. 7a and 8, the nut comprises an external thread that engages with an internal thread of a wall of the control means. The nut is also in abutment axially against an annular border of the rotor portion 97, at the level of the first end 97a. The annular border delimits the first cavity 101 of the rotor portion 97. Alternatively (see FIG. 1), the nut comprises an internal thread that engages with an external thread carried by a radially external surface of a cylindrical skirt 151 of the rotor portion. The cylindrical skirt 151 extends along the longitudinal axis and extends the rotor portion 97 upstream. The nut is arranged in axial abutment against a radial wall (such as a shoulder 64) of the control means 52. Such an attachment allows the transfer device 94 to be easily mounted/dismounted. According to another alternative shown in FIGS. 5 to 8, the nut comprises an external thread that engages with an internal thread carried by a radially internal surface of an extension of the tubular segment 62b upstream. In this case, the nut is arranged in axial abutment against an annular border of the rotor portion 97.

The transfer device 94 comprises advantageously means in fluidic communication with the feed source in one hand, and with the control means in the other hand. The stator portion 96 comprises at least one pipeline that extends through the thickness thereof. In FIG. 1, the stator portion 96 comprises a first pipeline 119 and a second pipeline 120 that are separate from each other. At least one segment of the second pipeline 120 extends radially outward from the first pipeline 119. The first pipeline 119 extends along the longitudinal axis along a major portion and opens into the downstream face 108b (extending in a plane perpendicular to the longitudinal axis X) of the flange of the stator portion 96. The first pipeline 119 is intended to be in fluidic communication with the first conduit 124 of the tubular element 99. The first pipeline 119 is formed at least partly by the cylindrical internal bore 115. In particular, the first pipeline 119 is formed by an internal bore 115 of the first tube 960, the internal cavity of the second tube 961, and the connection passage 115e. The second pipeline 120 extends along the longitudinal axis along a portion and also opens on the downstream face 108b of the stator portion 96. The second pipeline 120 is intended to be in fluidic communication with the second conduit 125 of the tubular element 99. The second pipeline 120 is formed by the annular space formed between the external surface of the cylindrical tube and the internal surface of the bore 115c and the connection passage 115c.

With reference to FIG. 6, sealing means are provided between the flange 108 and the collar 111 to prevent any risk of leak. In particular, annular seals 162 are respectively arranged in gorges 163 provided in the upstream face 111a. Each gorge 163 surrounds an orifice of outlet of the conduits 124, 125. The attachment of the flange 108 and the collar 111 allows the compression of the seals 162, which guarantees a tight connection. In fact, the outlet orifices of the conduits 124, 125 are in fluidic communication with the first and second openings 158, 152 when the flange and the collar 111 are in abutment against each other. Alternatively, a single annular seal is arranged on the upstream face 111a of the collar. This single seal may occupy the entire surface or be formed as an annular strip.

The stator portion 96 comprises advantageously first orifices 121 passing through its wall on either side along the radial axis. These first orifices 121 are formed upstream of the stator portion 96. The orifices 121 are provided in the first tube 960 of the stator portion 96 and where the first bore 115a is located. The first pipeline 119 opens into these first orifices 121 which form the outlet thereof. The inlet of the first pipeline 119 is formed by the first opening 158 of the stator portion. As for the second pipeline 120, it is arranged radially outside the first pipeline 119. The second pipeline 120 is annular and arranged coaxially with the longitudinal axis X. The second pipeline 120 opens into the second opening 152. The second opening 152 forms the inlet of the second pipeline 120. The stator portion 96 also comprises second orifices 123 formed in the wall thereof. The second orifices 123 pass through the wall on either side along the radial axis. These are provided in the second tube 961 of the stator portion and at the level of the third bore 115c. The second pipeline 120 also opens into these orifices 123 which form the outlet. These first and second orifices 121, 123 open onto the external cylindrical surface 103 of the stator portion 96. The first and second orifices 121, 123 are offset along the longitudinal axis. The first orifices 121 are arranged upstream of the second orifices 123.

The attachment interface allows for hydraulic connections between the pipelines 119, 120 of the stator portion 96 and the conduits 124, 125 of the tubular element 99, as well as the mechanical connections by attaching the flange 108 to the collar 111.

With reference to FIGS. 1, 3 and 7, the passage 83, allowing the access to the attachment members 83 passes through the transfer device 94 on both sides along an axis parallel to the longitudinal axis. The passage 83 has a circular cross-section. Of course, the passage 83 can have a different cross-sectional shape. The axis of the passage 83 is coaxial with the axis of the attachment members 85 ensuring an axial connection (or the axis of the corresponding holes 111c). In this example, the transfer device 94 comprises a plurality of passages 83 formed in the rotor portion 97 that are evenly distributed about the longitudinal axis. Here, there are as many passages 83 as there are attachment members. Of course, a single passage 83 would suffice to access the attachment members 85 as the rotor portion 97 rotates relative to the stator portion 96 which comprises the flange 108 to be attached. Each passage 83 opens on the one hand, in the upstream face 97a and on the other hand, in the downstream face 97b. Each passage 83 extends radially outwardly from the central bore 100 of the rotor portion 97.

In FIG. 5, the external attachment tool 170 is inserted into one of the passages 83 and reaches the corresponding screw 86 so that the screw can be screwed into the nut 87 and attach the flange 108 and the collar 111, or the screw can be unscrewed from the nut 87 to disengage the flange 108 from the collar 111. A hollow sheath 161 is releasably installed in each passage 83. This sheath 161 allows the external attachment tool 170 to be guided through the passage 83 towards the attachment members 85. The sheath 161 also allows the rotor portion 97 to be angularly wedged with the stator portion 96. To this end, each sheath 161 is elongated between a first end 161a and a second end 161b along an axis that is parallel to the axis of the passage in the installation situation. The second end 161b is housed in a counterbore 108d of the stator portion 96. The counterbore 108d is coaxial with the hole 108c and also opens into the hole 108c. In particular, the second end 161b is in abutment against the surface 84 forming the bottom of the counterbore 108d. The sheath 161 comprises at its first end 161a a collar 161c which extends radially outward and is in abutment against the upstream face 97a of the rotor portion 97 (in the installation situation). Thus, once installed between the flange and the rotor portion 97, the sheath 161 prevents the rotation of the rotor portion 97. The sheath 161 has an external diameter substantially equal to or less than the diameter of the passage 83 so as to ensure that the maintain of the sheath 161 in the passage or the passages. Advantageously, the sheath 161 is made of plastic material, which prevents damage to the rotor portion 97.

According to an advantageous characteristic, the radially external diameter D4 of the rotor portion 97 is greater than the diameter defined by the axis B of the hole 108c of axis B of the radial flange 108 of the stator portion 96. As previously discussed, the axis of each passage 83 is coaxial with a corresponding hole 111c. This implies that during the mounting, the stator portion 96 is mounted inside the rotor portion 97 before the stator portion 96 is in turn attached to the tubular element 99 with the attachment members 85 via the passage or the passages 83. Similarly, when the transfer device 94 is dismounted, the attachment members 85 are first extracted to disengage the flange 108 and the collar 111, before the transfer device 94 (stator portion and rotor portion) can be extracted from the turbomachine member.

In FIG. 1 and FIG. 8, the rotor portion 97 further comprises channels (shown as dotted lines in FIG. 1) which open into the central bore 100 on the one hand and into the external cylindrical surface 129 on the other. These channels are fluidly connected with the pipelines 119, 120 of the stator portion 96. The channels comprise at least one first channel 130 that extends along the radial axis and through the thickness of the wall of the rotor portion 97. At least one second channel 131 also extends along the radial axis and through the thickness of the rotor portion 97. When the stator portion 96 is mounted in the central bore 100, the first orifices 121 are arranged at the same axial position as the first channel 130. Similarly, the second orifices 123 are arranged at the same axial position as the second channel 131. The channels 130, 131 are also in fluidic communication with the feeding means of a member of the turbomachine (here the control means 52). The first and second bearings 140, 142 are arranged on either axial side of the channels 130, 131. The bearings 140, 142 on either side allow a precise air-gap to be maintained which allows for hydrostatic sealing. Another sealing means is of course possible. In this example, the first bearing 140 is mounted upstream of the first channel 130. The second bearing 142 is mounted downstream of the second channel 131.

As also visible in FIG. 3, two annular grooves or slots 137, 138 are formed in the external cylindrical surface 129 of the rotor portion 97. These grooves 137, 138 are distinct from each other. These grooves 137, 138 are open to the outside of the rotor portion 97 and are formed in a parallel manner. The first groove 137 is axially aligned with the first channel 130. The latter thus opens into the first groove 137. Similarly, the second groove 138 is axially aligned with the second channel 131. The second channel 131 thus opens into the first groove 137. The width of the grooves (along the longitudinal axis) is different, and in this example, the width of the first groove 137 is greater than that of the second groove 138. Advantageously, the radially internal surface of the control means 52 comprises annular grooves 143, 144 with shapes corresponding to those of the grooves 137 and 138. At least one of the grooves 137, 138 faces one of the corresponding grooves 137, 138 so as to channel the point fluid flows into a common flow. In particular, in the installation situation, a third groove 143 is axially aligned with the first groove 137 while the fourth groove 144 is axially aligned with the second groove 138.

With reference to FIG. 3, the internal cylindrical surface 104 of the rotor portion 97 also comprises annular grooves 145, 146 that are open inward thereof. The grooves 146, 145 are distinct from each other. The grooves 145 and 146 are respectively aligned with the grooves 137, 138. The internal diameter of the groove 146 or the bottom thereof is radially further outward than the diameter or the bottom of the groove 145. The first channel 130 also opens into the fifth groove 145. The second channel 131 opens into the sixth groove 146. The width of the grooves 145, 146 along the longitudinal axis are substantially the same.

FIGS. 7*a* through 7*d* illustrate some steps of a method for mounting a fluid transfer device in a turbomachine member. In particular, the mounting method comprises a step of assembling the transfer device 94. This assembly step comprises the insertion or the engagement of the stator portion 96 into the rotor portion 97. The stator portion 96 engaged with the rotor portion 97, has its second end 96*b* extending outside the rotor portion 97 with the flange 108. The stator portion 96 is mounted from downstream to upstream in the rotor portion 97. The pre-assembly of the transfer device 94 has the advantage of controlling the mounting of elements considered fragile, such as seals, rolling bearings, air-gap area, and of being adapted to test the level of the leaks at the end of the assembly and thus to deliver a reliable assembly.

The assembly step comprises a sub-step of placing at least one portion of the attachment members 85. The nut 87 is crimped onto the collar 11. This step can take place prior to the assembly of the transfer device 94. The screws 86 are mounted on the flange 108.

The method then comprises a step of attaching the fluid transfer device 94 to the control means 52. This step comprises an integration sub-step in which the transfer device 94 is mounted within the control means 52. In particular, the rotor portion 97 (with the stator portion 96) is engaged or inserted in the tubular segment 62*b* and the tightening member 135 is mounted downstream thereof to axially lock it. The seals are already installed in the grooves provided in the radially external surface 129 provided for this purpose. The insertion is done from upstream to downstream. The second end 96*b* of the stator portion 96 extends downstream of the control means 52. We can see in FIG. 7*a* that the external diameter D5 of the flange 108 is smaller than the diameter D4 of the rotor portion 97 (and the internal diameter of the tubular segment 62*b*). This implies that the attachment members 85 mounted on the flange 108 at least partly are not accessible once the transfer device 94 is mounted inside the control means 52. In particular, looking upstream, the screws 86 are only visible through the passages 83. We understand from this and the figures that the attachment members 85 are arranged downstream of the transfer device.

The method also comprises a step of inserting the sheath 161 into each passage 83. The sheath 161 is inserted until its second end 161*b* is inside the counterbore 108*d* of the flange 108. This step may be made prior to the step of attaching the device 94 in the control means 52 or at a later time.

The method comprises a step of placing the control means 52 equipped with the transfer device 94 into the turbomachine member (in this case the fan rotor). The assembly is displaced from upstream to downstream so that at least the flanges 56 and 57 cooperate as well as the flange 108 and the collar 111.

With reference to FIG. 7*a*, the method comprises a step of attaching the attachment interface of the stator portion 96 and the stator equipment by means of the attachment members 85 so as to achieve a, coincidence, with sealing of the pipeline of the transfer device 94 and of the conduit of the stator equipment. In particular, this step comprises a sub-step of docking the second end 96*b* of the stator portion 96 to the stator member 98. During this step, the attachment interfaces are connected. The hydraulic and mechanical connections of the transfer device 94 with the stator member 98 also take place during this step. Indeed, by displacing the transfer device 94 downstream, the flange 108 comes to be in abutment against the collar 111 as shown in FIG. 7*b*. The flange 56 of the control means 52 is also supported against the flange 57 of the fan shaft 32. This is possible because the external diameter D5 of the flange 108 is smaller than the internal diameter D7 of the flange 57. The external diameter D1 of the flange 56 is also smaller than the diameter D2 defined by the connection mechanism 51. A portion of the cylindrical wall 63*a* of the control means 52 as well as the second end 96*b* of the stator member 96 extends into the interior of the fan shaft 32.

In FIG. 7*c*, the attachment step comprises a sub-step of inserting the external tool 170 into at least the passage 83 of the transfer device 94 to access the attachment members 85. In particular, the external tool 170 is inserted into the passage 83 to tighten the screw 86 into the stacked nut 87 on the collar 111. The guidance of the external tool is facilitated by the sheath 161. This action is repeated for each screw 86 and nut 97. At the same time, the control means 52 is attached to the fan shaft 32 via the flanges 56, 57, 60. The flange 56 of the control means 52 is supported with the flange 57 and the attachment members 79 allow to attach the flanges together. The method comprises a step of removing the external tool 170 and also a step of removing the sheath 161 from the one or more passages 83. Advantageously, the step of removing the sheath 161 takes place after the step of removing the external tool 170.

The dismounting method comprises the mounting steps in reverse. During the dismounting, the stator member 98 may remain attached to the stationary structure of the turbomachine. The control means 52 may also remain attached to the fan shaft 32.

According to another embodiment shown in FIG. 8, the transfer device 94 also comprises a stator portion 96 installed at least partly within (inside) the rotor portion 97. In this embodiment, the elements that are identical or substantially identical and/or have the same functions are represented by the same numerical references as in the previously described embodiment. The rotor portion 97 rotates about the stator portion 96 by means of the first and second bearings 140, 142. The stator portion 96 extends between the rotor portion 97 and the stator member 98 along the longitudinal axis. The second end 96b of the stator portion 96 also extends outside the rotor portion 97, but also outside the cavity 102. In this example embodiment, the stator portion 96 is at least partly sealingly sleeved into a stator member 98 of the stator equipment (which is attached to the stationary structure here of the turbomachine). The stator member 98 is attached to the tubular element 99, which is hollow and is also attached to the planet carrier 38. In particular, the stator member 98 is arranged axially between the tubular element 99 and the transfer device 94. The radially external diameter D4 of the rotor portion 97 is greater than or equal to the external diameter of the stator member 98 delimited by the surface 110. The stator member 98 is also elongated along the longitudinal axis between an upstream face 98a and a downstream face 98b. The stator member 98 comprises an anchoring cavity 105 that extends within the thickness of the stator member 98. This anchoring cavity 105 is intended to receive the second end 96b of the stator portion 96. The anchoring cavity 105 opens into an opening 106 defined in the upstream face 98a. The latter is defined in a plane that is perpendicular to the longitudinal axis. The edge of the opening 106 comprises a chamfer 106a that allows to facilitate the second end 96b of the stator portion 96 to be inserted or sleeved into the anchoring cavity 105 in a blind and sealed manner. Indeed, the second end 96b of the stator portion 96 is blindly mounted in the stator member 98.

Advantageously, the chamfer 106a forms an angle with the plane of the upstream face 98a (and/or with the longitudinal axis). This angle can be between 10 and 45° in relation to the longitudinal axis. The chamfer 106a is inclined inward the anchoring cavity 105 and towards the axis of revolution of the stator member 98. This promotes the insertion of the second end 96b into the cavity 105. In particular, the second end 96b of the stator portion 96 substantially forms a cone segment (female segment) that fits into another cone segment (male segment) in order to achieve an easy guidance and a good orientation. The anchoring cavity 105 also comprises a bottom 107 that is located opposite the opening 106 along the longitudinal axis X.

The stator portion 96 also comprises a radial flange 108' that extends radially outward from its external cylindrical surface 103. The downstream face 108b is facing the upstream face 98a of the stator member 98 when the second end 96b of the stator portion is engaged in the anchoring cavity 105. The stator member 98 also comprises a radial flange 109 that extends radially outward from the external surface 110 of the stator member 98. This radial flange 109 is attached to the annular collar 111 of the tubular element 99 via attachment members 164 such as pins or screws and nuts.

In FIG. 8, the internal bore 115 of the stator portion 96 opens on either side thereof along the longitudinal axis. The internal bore 115 opens into a third opening 116 and a fourth opening 118. As in the first embodiment, the internal bore 115 is formed by the first tube 960 and by the second tube 961. The second hollow tube 961 is sealingly installed in the first tube 960. The internal cavity of the tube 961 is coaxial with the axis of first bore 115a and in communication with first bore 115a. The latter opens into the third opening 116 at the level of the first end 96a. In this example, a cap 171 is configured so as to close this third opening 116. The cap 171 comprises a finger 171a arranged within the bore. An annular seal 172 is mounted around this finger 171a and in contact with the internal surface of the stator portion 96 (the bore) to prevent the leaks of fluid outward of the stator portion 96 through the third opening 116. The cap 171 comprises a collar 171b that caps the external surface of the first end 96a of the rotor portion 97. The border of the collar 171 comes to rest on the internal ring of the first bearing 140. The cover 139 is mounted upstream of the cap 171 and upstream of the first bearing 140.

The tube 961 comprises a wall 117 in the form of a disc and which forms the bottom of the tube 961. In the installation situation, the wall 117 is arranged opposite the third opening 116 (and the cap 171) along the axis of the internal bore 115. The fourth opening 118 is formed in the wall 117 and passes through it on either side along the longitudinal axis X. The axis of the fourth opening 118 is coaxial with the axis of the internal bore 115. The first pipeline 119 is formed at least partly by the internal bore 115. The first pipeline 119 opens into the first orifices 121 which form the outlet thereof. The inlet of the first pipeline 119 is formed by the radial piercing 961d of the tube 961. The fourth opening 118 forms an attachment hole.

The second pipeline 120 is arranged radially outward of the first pipeline (i.e., the internal bore) and concentrically. The second pipeline 120 is also formed by the space between the wall of the tube 961 and the wall of the tube 960. In this example embodiment, the second pipeline 120 opens into an annular opening 122 that forms the inlet of the second pipeline 120. The annular opening 122 is defined in a downstream face 960b of the first tube 960 and into which the third bore opens. The second pipeline 120 is formed at least partly by the annular space formed between the external surface of the cylindrical second tube 961 and the internal surface of the first tube 960. In this manner, the annular opening 122a is formed by the first tube 960 that extends into the opening 122 of the bore 115. The second pipeline 120 also opens into the second orifices 123 which form the outlet thereof. These first and second orifices open onto the external cylindrical surface 103 of the stator portion 96. The first and second orifices 121, 123 are offset along the longitudinal axis. Similarly, the annular opening 122 is located in a radial plane that is offset from the plane in which the piercing 961d is defined.

The stator member 98 comprises ducts 124 and 125 which are intended to be in fluidic communication with the pipelines 119, 120 of the stator portion 96. The first conduit 124 and the second conduit 125 are connected to the feed source via the pipes and each open into the anchoring cavity 105.

Attachment members 150 are provided so as to securely maintain the stator portion 96 in the anchoring cavity 105 of the stator member 98. In the example shown in FIG. 8, the attachment members 105 comprise a single screw 150a with a threaded rod passing through the fourth opening 118 provided in the wall 117. The bottom 107 comprises a slot 107a with an axis coaxial with the axis of the anchoring cavity 105. The screw 150a also passes through the slot 107a. The wall 117 comprises a downstream face defined in a radial plane and in abutment against the bottom 107 of the anchoring cavity 105. In this way, the wall 117 and the bottom 107 form the attachment interface that releasably receives the attachment members 150. These ensure an axial connection that is aligned with the axis of the internal bore. When the wall 117 is attached to the bottom 107, a coincidence, with sealing, of the first pipeline 119 and of the second pipeline 120 and the conduits 124, 125 is achieved.

The inlet of the first pipeline 119 (radial piercing 961d) is coincident with the outlet of the first conduit 124. Similarly, the inlet of the second pipeline 120 is coincident with the outlet of the second conduit 125. The coincidences are realized at offset axial positions. The fluid exiting the first and second conduits does not open at the same location in the anchoring cavity 105. The inlet of the first pipeline 119 is downstream of the inlet of the second pipeline 120.

Sealing means are provided between the external cylindrical surface 103 of the stator portion 96 and a radially internal surface 127 of the stator member 98 to prevent the fluid leaks. The sealing means comprise annular seals that are arranged on either side of the annular opening 122 and the radial piercing 961d. In particular, an annular seal 128 is arranged downstream of the coincidence of the first conduit 124 and first pipeline 119 and an annular seal 128 is arranged downstream of the coincidence of the second conduit 124 and second pipeline 120. Another seal 128 is arranged upstream of the coincidence of the second conduit and second pipeline.

The stator member 98 thus allows the hydraulic connections between the pipelines of the stator portion 96 and the conduits 124, 125, as well as the mechanical connections of the transfer device 94 by attaching the wall 117 of the second end 96b to the bottom 107. The stator member 98 also allow the guidance of the stator portion 96 by receiving the rods 113.

In the example shown in FIG. 8, the stator portion 96 of the transfer device 94 comprises the passage 83 allowing the access of the external tool 170 to access the attachment members and which passes through both sides of the transfer device. The passage here is a single passage. It is formed by the internal bore which also serves as the first pipeline 119. The axis of the internal bore is coaxial with the axis of the fourth opening 118. In other words, the attachment members are arranged downstream of the transfer device When mounted with the attachment members 150, the screw 150a is inserted into the bore 115 of the stator portion 96 with the external tool 170 and passes through the fourth opening and the slot. The screw head presses against the upstream face of the wall 117. This mounting step is reversed for dismounting. The screw head is thus immersed in the fluid in the installation situation since the internal bore 115 acts as the first pipeline 119.

In an advantageous, but not limiting, characteristic, the stator portion 96 comprises anti-rotation elements intended to prevent the rotation of the stator portion 96 relative to the stator member. The anti-rotation elements comprise rods 113 (or gauges) that are elongated along the longitudinal axis. Three rods 113 extend from the flange 108 downstream and are each received in a passage 114 provided in the stator member. Each rod 113 is fitted and attached to the flange with suitable attachment members or is integrally (formed in one piece) formed with the flange 108. Each passage 114 passes through the stator member 98 on either side along an axis parallel to the longitudinal axis. In other words, the passage 114 opens on the upstream face on the one hand, and on the downstream face on the other. The rods 113 and passages 114 also form blindly sleeve means for blindly sleeve the stator portion onto the stator member 98. To this end, the passages 114 have a decreasing section from upstream to downstream. This makes it easier to insert the rods 113 into the passages 114. In addition, the free ends 113a of the rods have a frustoconical axial cross-section or an external surface converging towards a single summit. In this way, the insertion of the rods 113 is further facilitated in the passages 114, the space between the end 113a and the upper section segment being greater than the rest of the passage 114. The rods 113 also ensure that the transfer device is angularly maintained during the mounting relative to the stator member 98. Alternatively, the anti-rotation elements are carried by the stator member 98 and the passages 114 are provided in the stator portion 96 of the fluid transfer device 94.

Within the scope of the transfer device mounting method of FIG. 8, during the step of attaching the attachment interface, the rod or the rods 113 are inserted into the corresponding passages 114 and the second end 96b of the stator portion 96 is inserted into the anchoring cavity 105. The mounting of the transfer device 94 in the control means 52 is facilitated because the diameter D6 of the rods 113 and the external diameter D8 of the flange 108' are smaller than the external diameter D4 of the rotor portion 97. The diameter D6 determined by a circle in which all the rods 113 are inscribed. Similarly, it would be easy to leave the control means 52 mounted on the fan shaft 32 and only extract the transfer device 94 through the control means 52 with this configuration.

FIG. 9 illustrates another embodiment of the transfer device 94. In this embodiment, the elements that are identical or substantially identical and/or have the same functions are represented by the same numerical references as in the previously described embodiment. In this embodiment, the stator portion 96 is also provided with the bore 115 which is centred on the longitudinal axis. The difference between the embodiment of FIG. 8 and that of FIG. 9 is that the first pipeline 119 and the second pipeline 120 are concentric with the internal bore 115. In particular, the first annular pipeline 119 is arranged radially outward of the internal bore 115 and coaxially with the longitudinal axis. The second pipeline 120 is also annular and is arranged radially outward of the first pipeline 119, coaxial with the longitudinal axis. The attachment interface is provided by the wall of the stator portion 96 and the bottom wall of the stator member 98. The latter is attached to the tubular element 99. When the stator portion 96 is mounted to the stator member 98, the inlets of the first and second pipelines 119, 120 are in fluidic communication with the anchoring cavity 105 of the stator member 98. The second end 96b is attached to the bottom of the anchoring cavity 105 with the attachment member 150. In this example, no fluid flows through the internal bore 115. The mounting and dismounting is simple and efficient. This example of embodiment is even more compact. In this example of embodiment, the radially external diameter D4 of the rotor portion 94 is also less than or equal to the external diameter D8 of the flange 108' of the stator portion 96. It may be advantageous for the diameter D4 to be greater than the diameter D8 of the flange 108' so that the transfer device 94 can be extracted without dismounting the control means 52.

In order to avoid any leak of fluid during the dismounting, a seal (carbon or other) is mounted upstream of the guide bearing 140. Even more specifically, in order to maintain the sealing of the second end 96b of the stator portion 96 in the anchoring cavity 105, and in particular the interfaces between the stator portion 96 and the stator member 98, a staging of the distance measured for each interface has been provided. For example, the interface between the internal wall of the stator member 98 and a portion of the external surface of the second end 96, around the second pipeline 120, has a length l1. Similarly, the interface between the internal wall of the stator member 98 and a portion of the external surface of the second end 96, around the first pipeline 119, has a length l1. The interface between the internal wall of the stator member and a portion of the external surface of the second end 96, around the bore 115 (and downstream of a seal 128c), has a length l2. The length l2 is greater than the length l1. A suction drain system can be provided.

The step of docking the second end 96b into the stator member 98 is made in the same manner as in the previous embodiment. For the dismounting, it is sufficient to unscrew the screw 150a to disengage the transfer device 94 from the stator of the turbomachine.

In the various embodiments and as illustrated in FIG. 1, the control means 52 comprises means for feeding the chambers 72a, 72b. The feeding means comprises a third orifice 132 that passes through the annular body wall 53 along the radial axis at the level of the wall of the tubular segment 62b. This orifice 132 opens into the chamber 72a, upstream and is located substantially at the point where the first channel of the rotor portion opens. In this way, the fluid can circulate through the first pipeline 119, through the first channel 130, and then into the chamber 72a. The feeding means comprises a fourth orifice 133 that passes through the wall of the annular body along the radial axis and at the level of the tubular segment. The orifice 133 opens into the chamber 72b, downstream, and is located at the point where the second channel 131 of the rotor portion 97 opens. In this way, the fluid can circulate through the second pipeline 120, into the second channel 131, and then into the chamber 72b. The third orifice 132 is arranged in a plane that is offset from the plane in which the fourth orifice 133 is arranged along the longitudinal axis. The third orifice 132 is located upstream of the fourth orifice 133.

Sealing means are also arranged between the radially external surface 129 of the rotor portion 97 (each in a gorge) and the radially internal surface 134 of the tubular segment to prevent the leaks of fluid into the interior of the control means 52. The sealing means comprise annular seals 136 that are arranged axially on either side of the second channel 131 and also of the orifice 133. Seals are also installed upstream of the first channel 130 and also of the orifice 132.

In the various embodiments shown or alternatives, the fluid is an oil. Of course, the fluid can be an incompressible fluid.

The invention claimed is:

1. Transfer device of a fluid for a turbomachine with a longitudinal axis, the transfer device comprising a stator portion which is intended to be connected to a stator equipment of the turbomachine and a rotor portion wherein is engaged the stator portion, the rotor portion being movable in rotation around the stator part according to the longitudinal axis, wherein the stator equipment comprises at least one conduit fed by a feed source and in fluidic communication with at least one pipeline of the stator portion, the stator portion and the stator equipment comprising an attachment interface intended to releasably receive attachment members, the attachment interface and the attachment members being configured so as to make a coincidence, with sealing, of the pipeline and of the conduit, and in that the transfer device comprises at least one passage allowing the access of an external tool upstream of the transfer device for accessing the attachment members and passing through the transfer device on both sides.

2. Transfer device according to claim 1, wherein the rotor portion extends between an upstream face and a downstream face along the longitudinal axis, the rotor portion comprising a central bore centred on the longitudinal axis and in which the stator portion is engaged, the central bore opening into a first cavity opening onto the upstream face and into a second cavity opening onto the downstream face, bearings for guiding the rotor portion in rotation with respect to the stator portion being placed in the first cavity and in the second cavity, the stator portion extending, along the longitudinal axis, between a first end which is arranged in the first cavity and a second end which extends outside the rotor portion.

3. Transfer device according to claim 1, wherein the stator portion comprises a first pipeline and a second pipeline which are distinct, at least one segment of the second pipeline extending outside the first pipeline.

4. Transfer device according to claim 3, wherein the rotor portion comprises channels which are in fluidic communication, on the one hand, with the pipelines and, on the other hand, with feeding means for feeding a member of the turbomachine.

5. Transfer device according to claim 2 wherein the rotor portion comprises the passage which is arranged radially outside the central bore and in that the attachment interface comprises a collar carried by the stator equipment and a radial flange carried by the stator portion, the flange and the collar extending radially outward and being attached together by attachment members ensuring an axial connection that is aligned with the passage.

6. Transfer device according to claim 5, wherein the radial flange of the stator portion comprises at least one hole of axis and the rotor portion has a radially external diameter which is greater than the diameter defined by the axis of the hole of the radial flange of the stator portion.

7. Transfer device according to claim 6, wherein the collar of the stator equipment comprises at least one corresponding hole and in that the attachment members are captive and comprise at least one nut crimped on the radial collar of the stator equipment facing the corresponding hole, at least one screw being retained in the hole of the stator portion by a retaining ring, and segregating means for segregating the screw away from the corresponding hole.

8. Transfer device according to claim 3, wherein the stator portion is provided with an internal bore which is centred on the longitudinal axis and which at least partly forms the first pipeline, the second annular pipeline being arranged radially outside the first pipeline and coaxially with the longitudinal axis.

9. Transfer device according to claim 3, wherein the stator portion is provided with an internal bore which is centred on the longitudinal axis and which at least partly forms the passage, the first annular pipeline being arranged radially outside the internal bore and coaxially with the longitudinal axis, and in that the second annular pipeline is arranged radially outside the first pipeline and coaxially with the longitudinal axis.

10. Transfer device according to claim 2, wherein the stator equipment comprises an anchoring cavity into which the second end of the stator portion is sleeved in a sealed and blind manner, the anchoring cavity opening into an opening provided in an upstream face of the stator equipment and comprising a bottom arranged opposite the opening.

11. Transfer device according to claim 10, wherein the attachment interface comprises a first wall that is arranged at the second end of the stator portion and a second wall forming a bottom of the anchoring cavity, the first wall being attached to the second wall of the anchoring cavity via the attachment members ensuring an axial connection that is aligned with the axis of the internal bore.

12. Transfer device according to claim 5, wherein the rotor portion has a radially external diameter which is greater than or equal to the external diameter of the flange of the stator portion, the stator portion extending between the rotor portion and the stator equipment along the longitudinal axis.

13. Aircraft turbomachine comprising at least one transfer device according to claim 1.

14. Method for mounting a transfer device of a fluid according to claim 1 in a turbomachine member, the method comprising:
- a step of assembling the transfer device of a fluid during which the stator portion is inserted into the rotor portion,
- a step of attaching the transfer device to the control means,
- a step of placing the control means equipped with the transfer device in the turbomachine member, and
- a step of attaching the attachment interface for attaching the stator portion and the stator equipment by means of the attachment members so as to make a coincidence, with sealing, of the pipeline of the transfer device and of the conduit of the stator equipment, the attachment step comprises a sub-step of inserting an external tool into at least the passage of the transfer device to access the attachment members.

* * * * *